US012495243B2

(12) United States Patent
Li et al.

(10) Patent No.: US 12,495,243 B2
(45) Date of Patent: Dec. 9, 2025

(54) ACOUSTIC DEVICES

(71) Applicant: SHENZHEN SHOKZ CO., LTD., Guangdong (CN)

(72) Inventors: Yongjian Li, Shenzhen (CN); Shuailin Xie, Shenzhen (CN); Hao Ke, Shenzhen (CN); Lei Zhang, Shenzhen (CN); Zhen Wang, Shenzhen (CN); Liwei Wang, Shenzhen (CN); Peigeng Tong, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 324 days.

(21) Appl. No.: 18/301,281

(22) Filed: Apr. 17, 2023

(65) Prior Publication Data

US 2023/0254634 A1 Aug. 10, 2023

Related U.S. Application Data

(63) Continuation of application No. PCT/CN2021/095504, filed on May 24, 2021.

(30) Foreign Application Priority Data

Apr. 9, 2021 (CN) ......................... 202110383452.2

(51) Int. Cl.
*H04R 1/28* (2006.01)
*H04R 1/02* (2006.01)
(Continued)

(52) U.S. Cl.
CPC ........... *H04R 1/2811* (2013.01); *H04R 1/023* (2013.01); *H04R 1/1008* (2013.01);
(Continued)

(58) Field of Classification Search
None
See application file for complete search history.

(56) References Cited

U.S. PATENT DOCUMENTS

| | | | | |
|---|---|---|---|---|
| 10,951,976 B2 | 3/2021 | Wakeland et al. | | |
| 2007/0189563 A1* | 8/2007 | Sjursen | .................. | H04R 25/48 381/321 |

(Continued)

FOREIGN PATENT DOCUMENTS

| | | |
|---|---|---|
| CN | 103167390 A | 6/2013 |
| CN | 106937222 A | 7/2017 |

(Continued)

OTHER PUBLICATIONS

International Search Report in PCT/CN2021/095504 mailed on Jan. 6, 2022, 7 pages.

(Continued)

*Primary Examiner* — Walter F Briney, III
(74) *Attorney, Agent, or Firm* — METIS IP LLC

(57) ABSTRACT

The present disclosure provides an acoustic device. The acoustic device may include a housing, a transducer, and a diaphragm. The housing may be configured to form a cavity. The transducer may be arranged in the cavity and connected to the housing. The housing may produce a bone-conduction sound under an action of the transducer. The diaphragm may be connected between the transducer and the housing to divide the cavity into a first cavity and a second cavity. The housing may be provided with at least one pressure relief hole communicating with the first cavity and at least one sound modulation hole communicating with the second cavity. At least a portion of the at least one pressure relief hole and at least a portion of the at least one sound modulation hole may be arranged adjacently. The housing may be further provided with a sound outlet hole communicating with the second cavity. The diaphragm may produce
(Continued)

an air-conduction sound transmitted outward through the sound outlet hole during a relative movement of the transducer and the housing.

20 Claims, 19 Drawing Sheets

(51) Int. Cl.

| | |
|---|---|
| ***H04R 1/10*** | (2006.01) |
| ***H04R 1/34*** | (2006.01) |
| ***H04R 1/40*** | (2006.01) |
| ***H04R 7/12*** | (2006.01) |
| ***H04R 9/02*** | (2006.01) |
| ***H04R 9/04*** | (2006.01) |
| ***H04R 9/06*** | (2006.01) |
| ***H04R 23/02*** | (2006.01) |

(52) U.S. Cl.

CPC ......... *H04R 1/1075* (2013.01); *H04R 1/2826* (2013.01); *H04R 1/345* (2013.01); *H04R 1/406* (2013.01); *H04R 7/12* (2013.01); *H04R 9/025* (2013.01); *H04R 9/045* (2013.01); *H04R 9/06* (2013.01); *H04R 23/02* (2013.01); *H04R 1/1041* (2013.01); *H04R 2460/11* (2013.01); *H04R 2460/13* (2013.01)

(56) References Cited

U.S. PATENT DOCUMENTS

| | | | | |
|---|---|---|---|---|
| 2009/0074220 | A1* | 3/2009 | Shennib | H04R 25/02 381/328 |
| 2009/0245565 | A1* | 10/2009 | Mittleman | H04R 1/025 381/189 |
| 2014/0072161 | A1 | 3/2014 | Boyle et al. | |
| 2017/0164088 | A1* | 6/2017 | Fukuda | H04R 1/345 |
| 2018/0096674 | A1* | 4/2018 | Lin | G10K 11/178 |
| 2020/0045397 | A1 | 2/2020 | Wu et al. | |
| 2021/0067858 | A1* | 3/2021 | Struzik | H04R 1/1008 |
| 2021/0076123 | A1 | 3/2021 | Zhang et al. | |

FOREIGN PATENT DOCUMENTS

| | | | | |
|---|---|---|---|---|
| CN | 110650407 | A | 1/2020 | |
| CN | 111182426 | A | 5/2020 | |
| CN | 111954142 | A | 11/2020 | |
| CN | 112087700 | A | 12/2020 | |
| CN | 112437379 | A | 3/2021 | |
| CN | 112565964 | A | 3/2021 | |
| CN | 214708013 | U | 11/2021 | |
| JP | H07115695 | A | 5/1995 | |
| JP | 2534415 | Y2 | 4/1997 | |
| KR | 20050015290 | A | 2/2005 | |
| WO | WO-2007083903 | A1 * | 7/2007 | B06B 1/045 |
| WO | 2018079340 | A1 | 5/2018 | |

OTHER PUBLICATIONS

Written Opinion in PCT/CN2021/095504 mailed on Jan. 6, 2022, 5 pages.

First Office Action in Chinese Application No. 202110383452.2 mailed on Apr. 16, 2024, 12 pages.

The Extended European Search Report in European Application No. 21935678.9 mailed on Apr. 4, 2024, 8 pages.

Notice of Reasons for Refusal in Japanese Application No. 2023-534195 mailed on Jun. 24, 2024, 12 pages.

* cited by examiner

ACOUSTIC DEVICES

CROSS-REFERENCE TO RELATED APPLICATIONS

This application is a Continuation of International Application No. PCT/CN2021/095504, filed on May 24, 2021, which claims priority to Chinese application No. 202110383452.2 filed on Apr. 9, 2021, the entire contents of each of which are incorporated herein by reference.

TECHNICAL FIELD

The present disclosure relates to the technology field of electronic devices, and in particular to acoustic devices.

BACKGROUND

With the increasing popularity of electronic devices (e.g., acoustic devices), the electronic devices have become indispensable social and entertainment tools in people's daily lives. People have higher and higher requirements for the electronic devices. However, taking an acoustic device as an example, there are still some problems in the process of usage, such as poor sound quality, sound leakage, entry of foreign objects, complex structure, etc. Therefore, it is desirable to provide an acoustic device with a simple structure, which may improve sound quality, reduce sound leakage, and reduce or avoid the entry of foreign objects, thereby meeting the requirement of a user.

SUMMARY

One of embodiments in the present disclosure provides an acoustic device. The acoustic device may include a housing, a transducer, and a diaphragm. The housing may be configured to form a cavity. The transducer may be arranged in the cavity and connected to the housing. The housing produces a bone-conduction sound under an action of the transducer. The diaphragm may be connected between the transducer and the housing to divide the cavity into a first cavity and a second cavity. The housing may be provided with at least one pressure relief hole communicating with the first cavity and at least one sound modulation hole communicating with the second cavity. At least a portion of the at least one pressure relief hole may be arranged adjacent to at least a portion of the at least one sound modulation hole. The housing may also be provided with a sound outlet hole communicating with the second cavity. During a relative movement of the transducer and the housing, the diaphragm may produce an air-conduction sound transmitted outward through the sound outlet hole.

In some embodiments, the at least one pressure relief hole may include a first pressure relief hole and a second pressure relief hole. The first pressure relief hole may be arranged away from the sound outlet hole relative to the second pressure relief hole. An area of an outlet end of the first pressure relief hole may be larger than an area of an outlet end of the second pressure relief hole.

In some embodiments, the at least one sound modulation hole may include a first sound modulation hole and a second sound modulation hole. The first sound modulation hole may be arranged away from the sound outlet hole relative to the second sound modulation hole. An area of an outlet end of the first sound modulation hole may be larger than an area of an outlet end of the second sound modulation hole. The first pressure relief hole may be arranged adjacent to the first sound modulation hole. The second pressure relief hole may be arranged adjacent to the second sound modulation hole.

In some embodiments, the at least one pressure relief hole may further include a third pressure relief hole. The first pressure relief hole may be arranged away from the sound outlet hole relative to the third pressure relief hole. The area of the outlet end of the second pressure relief hole may be larger than an area of an outlet end of the third pressure relief hole.

In some embodiments, the sound outlet hole and the first pressure relief hole may be arranged on two opposite sides of the transducer.

In some embodiments, a distance between the pressure relief hole and the sound modulation hole that are arranged adjacent may be less than or equal to 2 mm.

In some embodiments, for the pressure relief hole and the sound modulation hole that are arranged adjacent, an area of an outlet end of the pressure relief hole is larger than an area of an outlet end of the sound modulation hole.

In some embodiments, outlet ends of the pressure relief hole and the sound modulation hole that are arranged adjacent may be covered with a first acoustic resistance mesh and a second acoustic resistance mesh, respectively. A porosity of the first acoustic resistance mesh may be greater than a porosity of the second acoustic resistance mesh.

In some embodiments, the acoustic device may further include a protective cover. The protective cover may cover periphery of the pressure relief hole and the sound modulation hole that are arranged adjacently. A first acoustic resistance mesh and a second acoustic resistance mesh may be arranged on a side, close to the housing, of the protective cover.

In some embodiments, a containing region is arranged on an outer surface of the housing. A bulge may be formed inside the containing region. The outlet ends of the sound modulation hole and the pressure relief hole that are arranged adjacent may be located on top of the bulge. The bulge and a side wall of the containing region may be spaced to form a containing groove surrounding the bulge.

In some embodiments, the protective cover may include a main cover plate covering the pressure relief hole and the sound modulation hole that are arranged adjacently. The first acoustic resistance mesh and the second acoustic resistance mesh may be fixed to a side, facing the pressure relief hole and the sound modulation hole, of the main cover plate.

In some embodiments, the protective cover may include an annular side plate. The annular side plate may be bent and connected to an edge of the main cover plate. The annular side plate may be inserted into the containing groove and fixedly connected to the housing through an adhesive in the containing groove.

In some embodiments, the acoustic device may further include a first annular film. The first annular film may surround the pressure relief hole and the sound modulation hole that are arranged adjacently. The first acoustic resistance mesh and the second acoustic resistance mesh may be fixed to the top of the bulge through the first annular film.

In some embodiments, the acoustic device may further include a second annular film. The second annular film may surround the pressure relief hole and the sound modulation hole that are arranged adjacently. The first acoustic resistance mesh and the second acoustic resistance mesh may be fixed to the main cover plate through the second annular film.

In some embodiments, the acoustic device may include a baffle plate and an auxiliary device. The baffle plate may be arranged in the second cavity and divide the second cavity into a first sub-cavity close to the first cavity and a second sub-cavity away from the first cavity. The sound outlet hole may be communicated with the first sub-cavity. The auxiliary device may include at least one of a button or a microphone. A portion of the auxiliary devices may be arranged in the second sub-cavity.

In some embodiments, the second sub-cavity may be filled with an adhesive.

In some embodiments, the acoustic device may further include a first microphone. The first microphone may be arranged in the cavity and capable of collecting sound outside the acoustic device. An angle between a vibration direction of the first microphone and a vibration direction of the transducer may be 65-115 degrees.

In some embodiments, the vibration direction of the first microphone and the vibration direction of the transducer may be perpendicular to each other.

In some embodiments, the acoustic device may further include a second microphone. An angle between a vibration direction of the second microphone and a vibration direction of the first microphone may be 65-115 degrees.

In some embodiments, the vibration direction of the second microphone and the vibration direction of the first microphone may be perpendicular to each other.

In some embodiments, the acoustic device may further include processing circuitry. The processing circuit may perform noise reduction processing on the sound signal collected by the first microphone based on a sound signal collected by the second microphone.

In some embodiments, a frequency response curve of the bone-conduction sound may have at least one resonant peak. The at least one resonant peak may satisfy an equation: $|f1-f2|/f1\leq 50\%$. f1 in the equation may refer to a resonant frequency of a resonant peak of the bone-conduction sound when the diaphragm is connected to the transducer and the housing. f2 in the equation may refer to a resonant frequency of a resonant peak of the bone-conduction sound when the diaphragm is disconnected from either of the transducer and the housing.

In some embodiments, the acoustic device may further include a sound conduction assembly connected to the housing. The sound conduction assembly may be provided with a sound conduction channel. The sound conduction channel may be communicated with the sound outlet hole to conduct the air-conduction sound. An area of an outlet end of the sound conduction channel may be greater than an area of an outlet end of each of the at least one pressure relief hole.

In some embodiments, the outlet end of the sound conduction channel may be covered with a third acoustic resistance mesh. A porosity of the third acoustic resistance mesh may be greater than a porosity of the first acoustic resistance mesh covered at an outlet end of at least a portion of the at least one pressure relief hole.

Additional features may be set forth in part in the description which follows, and in part may become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
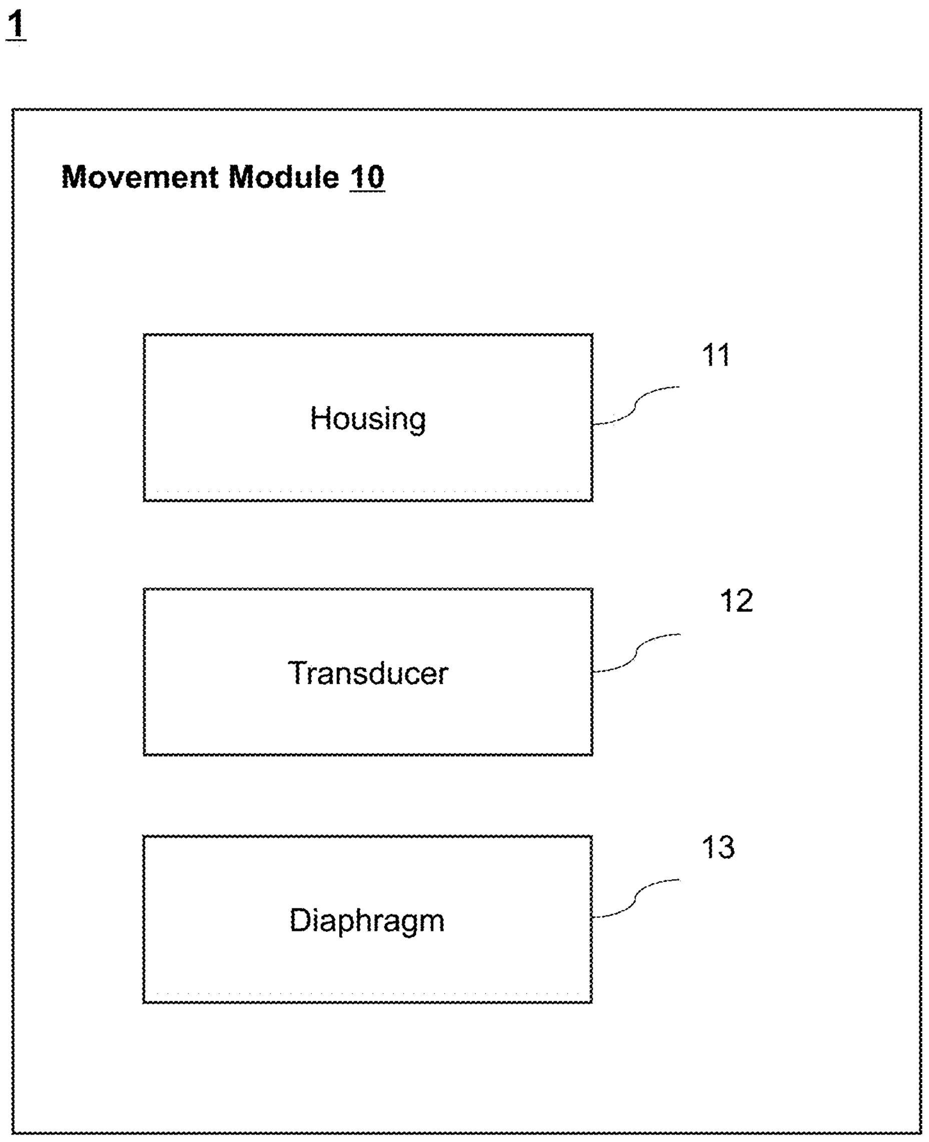
FIG. 1 is a schematic diagram illustrating a structure of an exemplary acoustic device according to some embodiments of the present disclosure.

In order to illustrate the technical solutions related to the embodiments of the present disclosure, a brief introduction of the drawings referred to in the description of the embodiments is provided below. Obviously, the drawings described below are only some examples or embodiments of the present disclosure. Those skilled in the art, without further creative efforts, may apply the present disclosure to other similar scenarios according to these drawings. Unless apparent from the locale or otherwise stated, like reference numerals represent similar structures or operations throughout the several views of the drawings.

It will be understood that the term "system," "device," "unit," and/or "module" used herein are one method to distinguish different components, elements, parts, sections, or assembly of different levels in ascending order. However, the terms may be displaced by another expression if they achieve the same purpose.

As used in the disclosure and the appended claims, the singular forms "a," "an," and/or "the" may include plural forms unless the content clearly indicates otherwise. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

An acoustic device is provided in embodiments of the present disclosure. The acoustic device may include a housing, a transducer, and a diaphragm. The housing may be configured to form a cavity. The transducer may be arranged in the cavity and connected to the housing and vibrate under a drive of an electrical signal. The diaphragm may be driven by the transducer to vibrate to produce an air-conduction sound. The diaphragm may be connected between the transducer and the housing to divide the cavity into a first cavity and a second cavity. The housing may be provided with at least one pressure relief hole communicating with the first cavity and at least one sound modulation hole communicating with the second cavity. At least a portion of the at least one pressure relief hole may be arranged adjacent to at least a portion of the at least one sound modulation hole. The housing may also be provided with a sound outlet hole communicating with the second cavity. In some embodiments, the vibration produced by the transducer is transmitted to the housing to cause a pronounced vibration of the housing. The vibration of the housing will be further transmitted to a user through a region that is on the housing and in contact with the user, thereby producing a bone-conduction sound that may be perceived by the user. At the same time, the air-conduction sound produced by the diaphragm may be transmitted outward to the user through the sound outlet hole, so that the user may hear the air-conduction sound. At this point, the acoustic device may produce both bone-conduction sound and the air-conduction sound transmitted simultaneously to the user, and for convenience, the acoustic device may be called a combined air-conduction bone-conduction acoustic device. In some alternative embodiments, the transducer may only cause the housing to produce a weak and almost imperceptible vibration by the user. In such cases, the acoustic device may be considered to produce only the air-conduction sound transmitted to the user, and for convenience, the acoustic device may be called an air-conduction acoustic device. In the embodiments of the present disclosure, unless otherwise stated, structures (e.g., the sound outlet hole, the sound modulation hole, the pressure relief hole, an acoustic resistance mesh, etc.) related to the produced air-conduction sound may be applied to a situation where the above-mentioned acoustic device capable of producing both the bone-conduction sound and the air-conduction sound, or may be applied to, without any creative effort of those skilled in the art, a situation where the above-mentioned acoustic device capable of producing only the air-conduction sound.

In some embodiments, the acoustic device may output both the bone-conduction sound and the air-conduction sound by arranging a diaphragm between the transducer and the housing, which may realize a complementarity of the bone-conduction sound and the air-conduction sound in a specific frequency band and conduce improving the sound quality of the acoustic device. In some embodiments, since the first cavity and the second cavity are separated by structural members such as the diaphragm and the transducer, a change law of air pressure in the first cavity is opposite to a change law of the air pressure in the second cavity, so that a change of the air pressure in the second cavity may be hindered by the first cavity. In some embodiments, the first cavity is communicated with an external environment by arranging the at least one pressure relief hole communicating with the first cavity, which may reduce the hindrance of the first cavity to the change of the air pressure in the second cavity, thereby improving the sound quality (e.g., an acoustic performance) of the acoustic device. Further, by arranging the at least one sound modulation hole communicating with the second cavity, a high-pressure region of the second cavity may be destroyed, thereby reducing a wavelength of a standing wave in the second cavity, so that a resonant frequency of a resonant peak of the air-conduction sound output to the outside of the acoustic device through the sound outlet hole is shifted toward a high frequency to improve the acoustic performance of the acoustic device. In addition, in some embodiments, the at least a portion of the at least one pressure relief hole is arranged adjacent to the at least a portion of the at least one sound modulation hole, so that the sound leakage output outside of the acoustic device through the pressure relief hole and the sound modulation hole that are arranged adjacently interferes and cancels each other, thereby reducing the sound leakage of the acoustic device to the external environment.

FIG. 1 is a schematic diagram illustrating a structure of an exemplary acoustic device according to some embodiments of the present disclosure. As shown in FIG. 1, an acoustic device 1 may include a movement module 10. The movement module 10 may convert an electrical signal into a mechanical vibration to enable a user to hear a sound through the acoustic device 1. In some embodiments, a count of movement modules 10 included in the acoustic device 1 may be one or more (e.g., two). Merely by way of example, when the acoustic device 1 includes two movement modules 10, the two movement modules 10 may be arranged close to the user's left and right ears, respectively when the user wears the acoustic device 1. The two movement modules 10 may communicate in a wired manner or a wireless manner. When the two movement modules 10 communicate through the wireless manner, there may be or may be no physical connection structure between the two movement modules 10. For example, each of the two movement modules 10 may be provided with an ear-hook structure, which may be used to fix the corresponding movement module 10 near the user's left or right ear, or two ear-hook structures of the two movement modules 10 may be connected to each other through a connecting rod.

In some embodiments, a housing 11 may be an enclosed or semi-enclosed structure that is hollow inside, and other components (e.g., a transducer 12, a diaphragm 13) of the acoustic device 1 are disposed in or on the housing 11. For example, the housing 11 may form a cavity, and other components of the acoustic device 1 may be arranged in the cavity and physically connected to the housing 11. Merely by way of example, the physical connection may include an injection molded connection, welding, riveting, bolting, gluing, snap-fitting, or the like, or any combination thereof. In some embodiments, a shape of the housing 11 may be a regular or irregular three-dimensional structure such as a rectangle, a cylinder, a round table, etc. In some embodiments, the housing 11 or a portion thereof may have a shape (e.g., circular, semicircular, oval, polygonal (regular or irregular), U-shaped, V-shaped, semicircular, etc.) adapted to a human ear, so that the housing 11 may be hung on or close to the user's ear. In some embodiments, the housing 11 may have a thickness to ensure sufficient strength to better protect components (e.g., the transducer 12, the diaphragm 13) of the acoustic device 1 arranged in the cavity formed by the housing 11. The housing 11 or a portion thereof may be located at or close to the user's ear when the user wears the acoustic device 1. For example, the housing 11 may be located on a circumferential side (e.g., a front side, a rear side) of the user's ear canal or auricle or in front of the user's tragus.

In some embodiments, when the acoustic device 1 is an air-conduction acoustic device, the housing 11 may or may not be in contact with the skin of the user. In some embodiments, when the acoustic device 1 is a combined air-conduction bone-conduction acoustic device, at least one side of the housing 11 may be in contact with the skin of the user. For example, the housing 11 may include a first housing (also be referred to as a front housing) and a second housing (also be referred to as a rear housing) that is physically connected (e.g., snap-fitting) to the first housing. The first housing and the second housing may together enclose the cavity. When the user uses the acoustic device 1, the first housing may be in contact with the skin of the user, i.e., when the housing 11 is in contact with the user's skin, the first housing is closer to the user relative to the second housing. A region of the first housing in contact with the skin of the user may be referred to as a skin-contact region. More descriptions regarding the housing 11 may be found elsewhere in the present disclosure, e.g., FIG. 3, FIG. 4, and the descriptions thereof.

The transducer 12 may be arranged in the cavity formed by the housing 11 and physically connected to the housing 11. The transducer 12 may include a coil and a magnetic circuit assembly. In some embodiments, the transducer 12 may convert an electrical signal (e.g., current in the coil) into a mechanical vibration (e.g., relative movement of the coil and magnetic circuit assembly) in an energized state. For air-conduction acoustic devices, the coil in the transducer 12 may be fixed directly to the diaphragm 13. The vibration of the transducer 12 may directly drive the diaphragm 13 to vibrate to produce air-conduction sound. For the combined air-conduction bone-conduction acoustic device, the skin-contact region of the housing 11 produces pronounced vibration under an action (e.g., the coil or magnetic circuit assembly in the transducer 12 is directly connected to the skin-contact region of the housing 11 through a structure with a certain stiffness) of the transducer 12. The mechanical vibration produced in the skin-contact region may be transmitted to the user's auditory nerve through the user's bones and/or tissues, thereby enabling the user to hear the bone-conduction sound. More descriptions regarding the transducer 12 may be found elsewhere in the present disclosure, e.g., FIG. 3, FIG. 5, and the descriptions thereof.

The diaphragm 13 may divide the cavity formed by the housing 11 into a first cavity (also referred to as a front cavity) and a second cavity (also referred to as a rear cavity). In some embodiments, the first cavity may be close to the skin-contact region of the housing 11, and the second cavity may be away from the skin-contact region of the housing 11, i.e., when the user is wearing the acoustic device 1, the first cavity may be closer to the user relative to the second cavity. In some embodiments, the housing 11 may be provided with a sound outlet hole communicating with the first cavity and/or the second cavity, and the diaphragm 13, driven by the transducer 12, may produce the air-conduction sound transmitted to the human ear through the sound outlet hole. Therefore, the sound produced in the first cavity and/or the second cavity may be transmitted outward through the sound outlet hole, and further transmitted to the user's eardrum through the air, thereby enabling the user to hear the air-conduction sound. In some embodiments, when the acoustic device 1 is the air-conduction acoustic device, the diaphragm 13 may be physically connected to two opposite side walls of the housing 11, and the diaphragm 13 may be driven directly by the coil in the transducer 12 to produce the vibration. In some embodiments, when the acoustic device 1 is the combined air-conduction bone-conduction acoustic device, the diaphragm 13 may be connected between the transducer 12 and the housing 11 (e.g., the diaphragm 13 may be affixed to or wrapped around one side of the magnetic circuit assembly, and the vibration of the magnetic circuit assembly drives the diaphragm 13 to vibrate), and a movement of the transducer 12 relative to the housing 11 drives the diaphragm 13 to produce the air-conduction sound transmitted to the human ear through the sound outlet hole. More descriptions regarding the diaphragm 13 may be found elsewhere in the present disclosure, e.g., FIG. 3 and the descriptions thereof.

In some embodiments, the acoustic device 1 may include a fixing structure (not shown). The fixing structure may be configured to fix the acoustic device 1 at or close to the user's ear, and the acoustic device 1 may or may not block the user's ear. In some embodiments, the fixing structure may be physically connected (e.g., snap-fitting, bolting, etc.) to the housing 11 of the acoustic device 1. In some embodiments, the housing 11 of the acoustic device 1 may be a portion of the fixing structure. In some embodiments, the fixing structure may include an ear-hook, a rear-hook, an elastic band, a spectacle leg, etc., so that the acoustic device 1 may be better fixed at or close to the user's ear to prevent the acoustic device 1 from dropping when the user using it. For example, the fixing structure may be an ear-hook configured to be worn around an ear region. In some embodiments, the ear-hook may be a continuous hook that may be elastically stretched to be worn in the user's ear, while the ear-hook may also exert pressure on the user's ear contour such that the acoustic device 1 is firmly fixed to the user's ear or a specific location on the head. In some embodiments, the ear-hook may be a discontinuous band. For example, the ear-hook may include a rigid portion and a flexible portion. The rigid portion may be made of a rigid material (e.g., plastic or metal), and fixed to the housing 11 of the acoustic device 1 by a physical connection (e.g., snap-fitting, bolting, etc.). The flexible portion may be made of a resilient material (e.g., fabric, composite material, or/and neoprene). As another example, the fixing structure may be a neck strap configured to be worn around a neck/shoulder region. As yet another example, the fixing structure may be a spectacle leg, which is mounted on the user's ear as a portion of the spectacle.

It should be noted that the above descriptions of the acoustic device 1 are merely provided for the purposes of illustration, and not intended to limit the scope of the present disclosure. For those skilled in the art, various amendments and variations may be made to the acoustic device 1 under the teachings of the present disclosure. In some embodiments, the acoustic device 1 may also include other components, for example, a master control circuit board, a battery, etc. These amendments and variations remain within the scope of the present disclosure.

Figure 2:
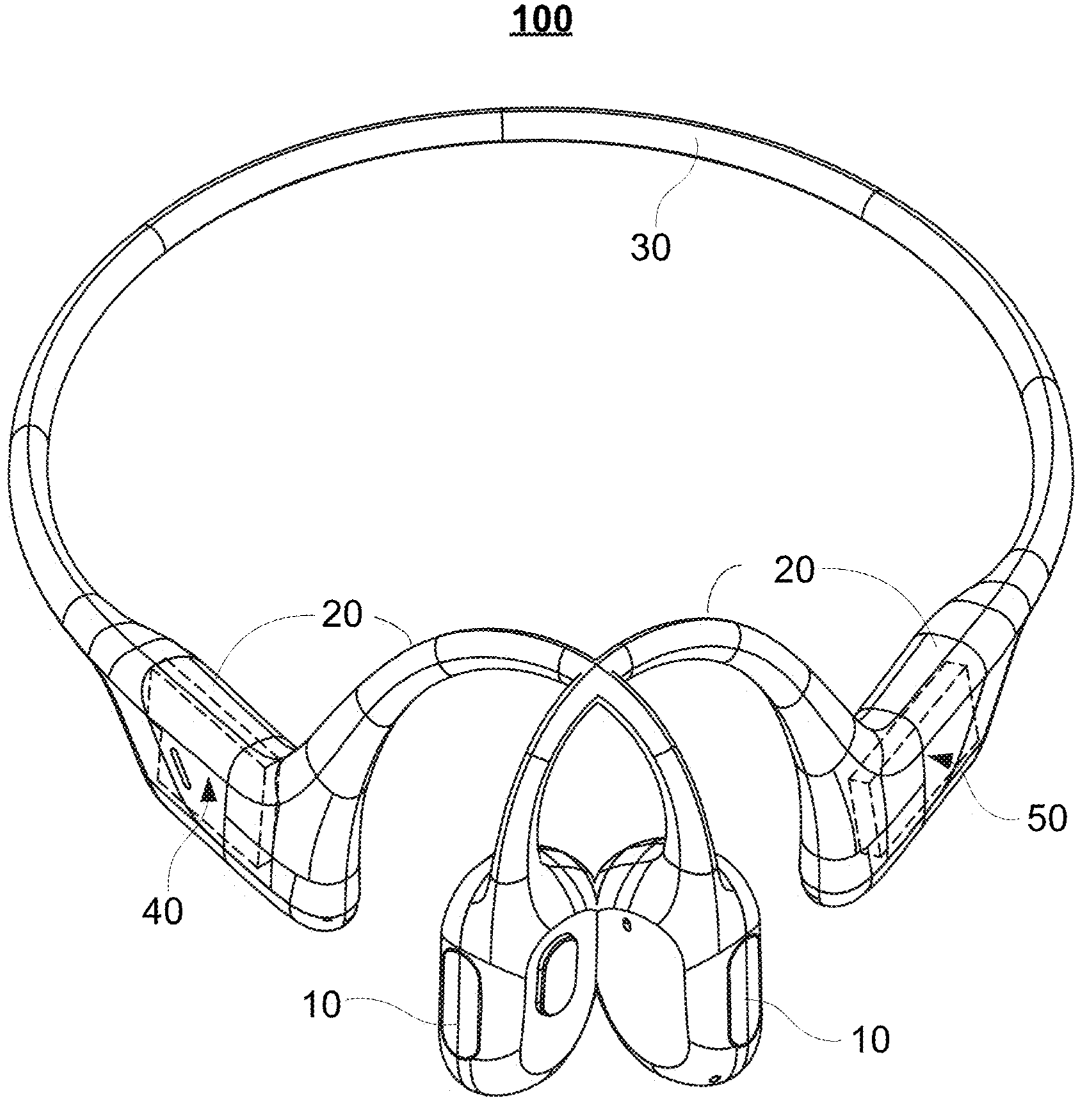
FIG. 2 is a schematic diagram illustrating a structure of an exemplary acoustic device according to some embodiments of the present disclosure.

FIG. 2 is a schematic diagram illustrating a structure of an exemplary acoustic device according to some embodiments of the present disclosure. As shown in FIG. 2, an acoustic device 100 may include two movement modules 10 and a fixing structure connected between the two movement modules 10. The fixing structure may include two ear-hook assemblies 20 and a rear-hook assembly 30. In some embodiments, when the acoustic device 100 is worn, the ear-hook assembles 20 may be hung on the user's ears. Merely by way of example, the ear-hook assembles 20 may be in a curved shape to be hung on the user's ears. Each of the ear-hook assemblies 20 may be fixed to the rear-hook assembly 30 and one movement module 10 and arranged between the rear-hook assembly 30 and the movement module 10. Merely by way of example, one end of the ear-hook assembly 20 away from the rear-hook assembly 30 is connected to the movement module 10. Two ends of the rear-hook assembly 30 are respectively connected to one ear-hook assembly 20. Merely by way of example, the rear-hook assembly 30 may be in a curved shape, so that when the acoustic device 100 is worn, the rear-hook assembly 30 may be wrapped around the back side of the user's head or neck, thereby ensuring the acoustic device 100 to be worn stably. It should be noted that the above descriptions regarding the wearing manners (e.g., the ear-hook assemblies 20, the rear-hook assembly 30) of the acoustic device 100 are merely provided for the purposes of illustration, and do not limit the scope of the present disclosure. In some embodiments, the acoustic device 100 may also have other wearing manners, for example, the ear-hook assemblies 20 cover or wrap around the user's ears, and the rear-hook assembly 30 spans the top of the user's head, or the rear-hook assembly 30 may be removed, and each of the ear-hook assemblies 20 may hang the corresponding movement module 10 close to the user's ears.

When the acoustic device 100 is worn, the two movement modules 10 may be located on a left side and a right side of the user's head, respectively. For example, when the acoustic device 100 is an air-conduction acoustic device, sound outlet holes of the two movement modules 10 may be located at or close to the left and right ear canals of the user, respectively, so that the user may hear the air-conduction sound output from the acoustic device 100. As another example, when the acoustic device 100 is a combined air-conduction bone-conduction acoustic device, the two movement modules 10 may be pressed on the user's head through cooperative action of the ear-hook assemblies 20 and the rear-hook assembly 30, so that the bone-conduction sound produced by the acoustic device 100 is transmitted to the user's auditory nerve through the user's bones and/or tissues, thereby enabling the user to hear the bone-conduction sound. Merely by way of example, as shown in FIG. 2, each of the two movement modules 10 may produce air-conduction sound and/or bone-conduction sound, thereby enabling the acoustic device 100 to achieve a stereo sound effect. In other application scenarios that do not require high stereo effects, e.g., hearing aids for hearing patients, teleprompters in a live broadcast by the host, etc., the acoustic device 100 may be a single-sided acoustic device, i.e., only one movement module 10 is provided.

In some embodiments, as shown in FIG. 2, the acoustic device 100 may further include a master control circuit board 40 and a battery 50. The master control circuit board 40 may be configured to control other components (e.g., the movement modules 10) of the acoustic device 100 to implement functions of the acoustic device 100. For example, the master control circuit board 40 may be electrically connected to each of the movement modules 10 through wires to control the movement module 10 to convert the electrical signal into the mechanical vibration. The battery 50 may be configured to provide electrical power to other components (e.g., the movement modules 10, the master control circuit board 40) of the acoustic device 100. For example, the battery 50 may be electrically connected to each of the movement modules 10 through wires to provide the electrical power to the movement module 10. In some embodiments, the master control circuit board 40 and the battery 50 may be arranged in a same ear-hook assembly 20, or may be arranged in two ear-hook assemblies 20, respectively.

In some embodiments, the acoustic device 100 may also include an auxiliary device (not shown) to expand the function of the acoustic device 100. Merely by way of example, the auxiliary device may include a button (also referred to as a function button), a microphone (also referred to as a pickup), a communication element (e.g., Bluetooth, near-field communication (NFC)), etc. The button may implement, In response to the press of the user, some functions (e.g., play/pause, power on/off) of the acoustic device 100, thereby extending the interaction ability between the acoustic device 100 and the user. The microphone may be configured to pick up the user's speech. The acoustic device 100 may implement some functions based on the user's speech picked up by the microphone, for example, making voice calls to other users, recording voice messages, or controlling the acoustic device 100 based on the user's speech picked up by the microphone. The master control circuit board 40 may be connected to the auxiliary device through wires to control the auxiliary device. The battery 50 may be connected to the auxiliary device through wires to power the auxiliary device. In some embodiments, the auxiliary device may be arranged in a cavity formed by the housing 11 of any one of the movement modules 10. In some embodiments, the auxiliary device may be integrated into any one of the movement modules 10 or be a portion of the movement module 10.

It should be noted that the above descriptions of the acoustic device 100 are merely provided for the purposes of illustration, and not intended to limit the scope of the present disclosure. For those skilled in the art, various amendments and variations may be made to the acoustic device 100 under the teachings of the present disclosure. For example, the master control circuit board 40 and/or the battery 50 may be arranged in the rear-hook assembly 30. As another example, the auxiliary device may be arranged in any one of the ear-hook assemblies 20 or the rear-hook assembly 30. These amendments and variations remain within the scope of the present disclosure.

Figure 3:
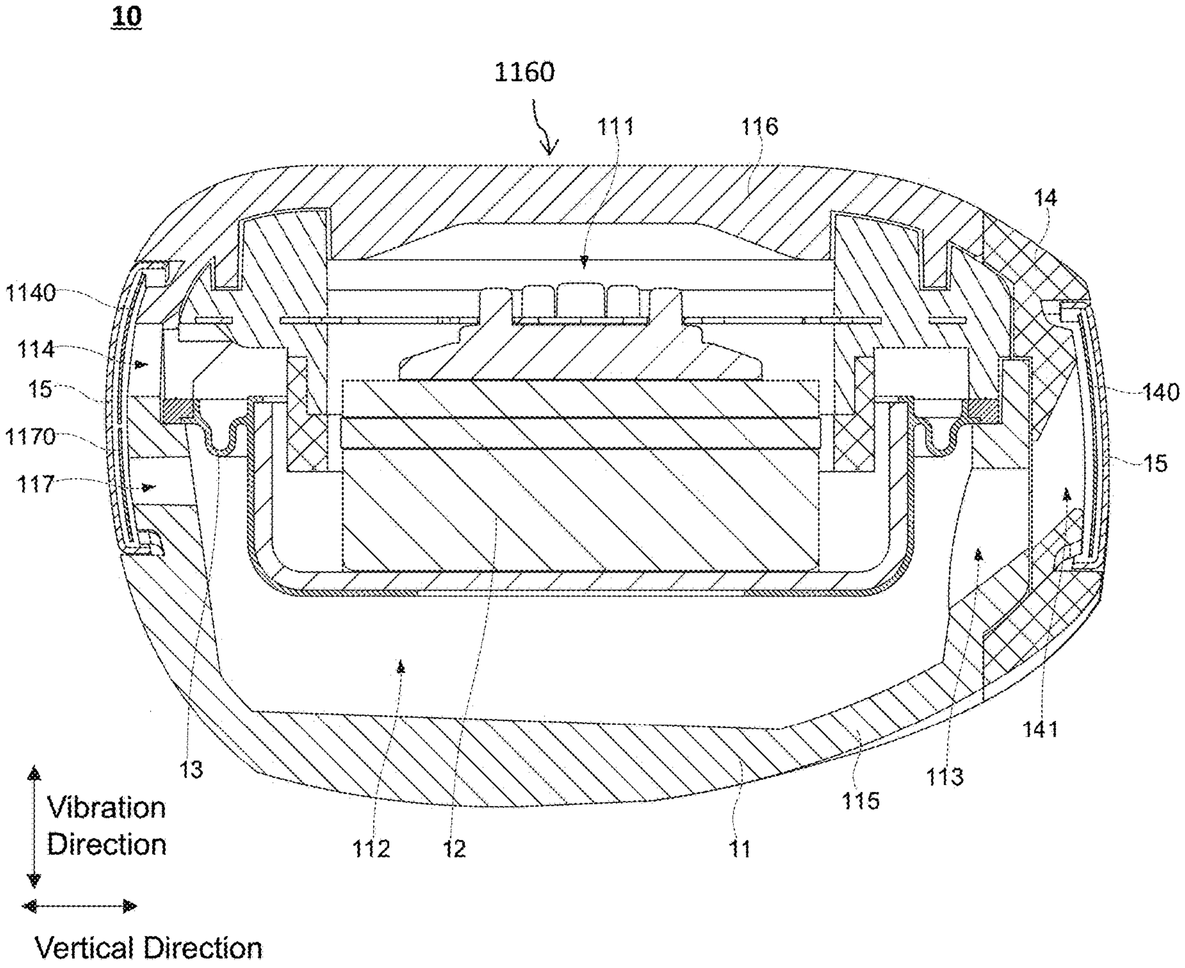
FIG. 3 is a schematic diagram illustrating a cross-sectional structure of an exemplary movement module according to some embodiments of the present disclosure.
Figure 4:
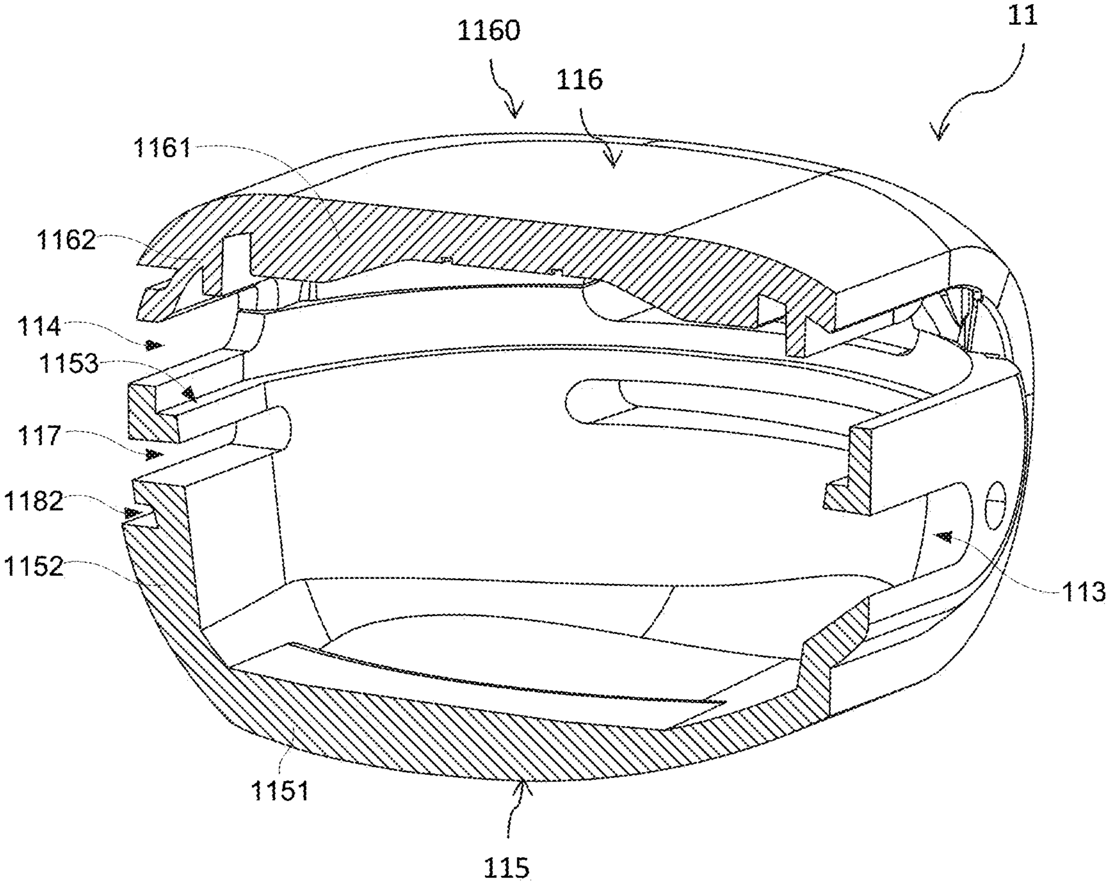
FIG. 4 is a schematic diagram illustrating a cross-sectional structure of a housing according to some embodiments of the present disclosure.
Figure 5:
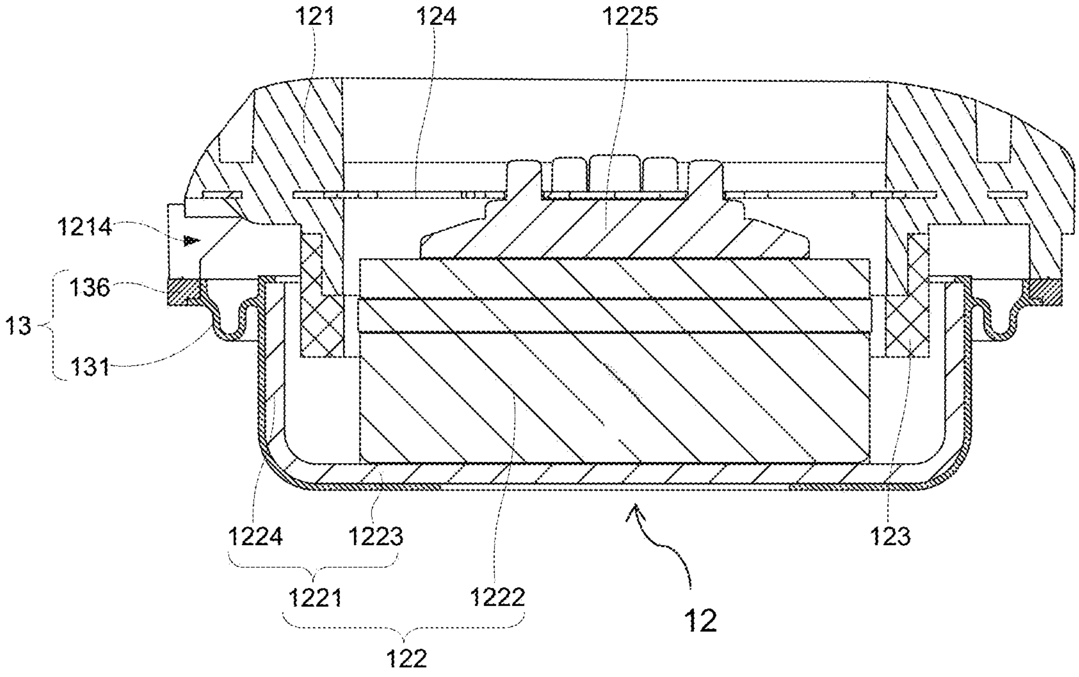
FIG. 5 is a schematic diagram illustrating a cross-sectional structure of a transducer according to some embodiments of the present disclosure.

FIG. 3 is a schematic diagram illustrating a cross-sectional structure of an exemplary movement module according to some embodiments of the present disclosure. FIG. 4 is a schematic diagram illustrating a cross-sectional structure of a housing 11 according to some embodiments of the present disclosure. FIG. 5 is a schematic diagram illustrating a cross-sectional structure of a transducer 12 according to some embodiments of the present disclosure.

As shown in FIG. 3, a movement module 10 may include a housing 11. As shown in FIG. 3 and FIG. 4, the housing 11 may include a first housing 116 and a second housing 115 physically connected (e.g., snap-fitting) to the first housing 116. The first housing 116 and the second housing 115 may together enclose a cavity. In some embodiments, as shown in FIG. 4, the first housing 116 may include a base plate 1161 and a side plate 1162. The base plate 1161 and the side plate 1162 may be integrally connected. An end of the side plate 1162 away from the base plate 1161 may be connected to the second housing 115. In some embodiments, a region where the base plate 1161 is located may be used as a skin-contact region 1160 of the housing 11. As shown in FIG. 4, the second housing 115 may include a base plate 1151 and a side plate 1152. The base plate 1151 and the side plate 1152 may be integrally connected. An end of the side plate 1152 away from the base plate 1151 may be connected to the first housing 116. In some embodiments, as shown in FIG. 4, an inner side of the housing 11 may be provided with an annular support platform 1153. Merely by way of example, the annular support platform 1153 may be arranged at one end of the side plate 1152 away from the base plate 1151. Taking the base plate 1151 as a reference, the annular support platform 1153 may be slightly lower than an end surface of the side plate 1152 away from the base plate 1151.

In some embodiments, as shown in FIG. 3, the movement module 10 may include a transducer 12. The transducer 12 may be arranged in the cavity enclosed by the first housing 116 and the second housing 115. The transducer 12 may be connected to the first housing 116 such that the transducer 12 may drive the skin-contact region 1160 of the housing 11 to produce mechanical vibrations. Specifically, the transducer 12 may convert electrical signals into mechanical vibrations in an energized state, such that the skin-contact region 1160 of the housing 11 produces the mechanical vibrations under the action of the transducer 12. Further, when the user wears an acoustic device (e.g., the acoustic device 1, the acoustic device 100), the mechanical vibrations produced by the skin-contact region 1160 of the housing 11 are transmitted to the user's auditory nerve through the user's bones and/or tissues, thereby enabling the user to hear the bone-conduction sound.

In some embodiments, as shown in FIG. 3, the movement module 10 may include a diaphragm 13 connected between the transducer 12 and the housing 11.

The diaphragm 13 may be fixed to the second housing 115 or the first housing 116, or a splicing position between the second housing 115 or the first housing 116. Merely by way of example, the diaphragm 13 may be fixed to the annular support platform 1153. The diaphragm 13 may divide an internal space (i.e., the cavity) of the housing 11 into a first cavity 111 close to the first housing 116 and a second cavity 112 close to the second housing 115. When the user is wearing the acoustic device, the first cavity 111 may be closer to the user relative to the second cavity 112.

In some embodiments, as shown in FIG. 3, the housing 11 may be provided with a sound outlet 113 communicating with the second cavity 112. The sound outlet 113 may be arranged in the second housing 115 of the housing 11. Merely by way of example, the sound outlet 113 may be arranged in the side plate 1152. As shown in FIG. 3 and FIG. 4, the sound outlet 113 may be located between the annular support platform 1153 and the base plate 1151 in a vibration direction of the transducer 12. In some embodiments, a cross-sectional area of the sound outlet 113 may be progressively smaller from the interior to the exterior of the housing 11. During a relative movement of the transducer 12 and the housing 11, the diaphragm 13 may produce an air-conduction sound transmitted outward through the sound outlet hole 113. Further, the air-conduction sound may be transmitted to the user's eardrum through the air, so that the user can hear the air-conduction sound. In some embodiments, a wall surface surrounding the second cavity 112 may be as smooth and round as possible, which may improve the acoustic performance of the air-conduction sound of the acoustic device.

In some embodiments, as shown in FIG. 3, the transducer 12 moves the skin-contact region 1160 toward the user's face (i.e., moves upward along a vibration direction in FIG. 3), which may be regarded as bone-conduction sound enhancement. In such cases, due to a reaction force, the transducer 12 and the diaphragm 13 connected to the transducer 12 move in a direction away from the user's face (i.e., moves downward along the vibration direction in FIG. 3), which causes the air in the second cavity 112 to be squeezed and the air pressure in the second cavity 112 to be increased, thereby forming a high-pressure region. As a result, the sound transmitted through the sound outlet 113 is enhanced, which may be regarded as an air-conduction sound enhancement. Similarly, when the bone-conduction sound is weakened, the air pressure in the second cavity 112 decreases, such that a low-pressure region is formed, and the air-conduction sound is also weakened. Therefore, phases of the bone conduction sound and the air conduction sound produced by the movement module 10 are the same.

Through the above settings, the air-conduction sound and bone-conduction sound produced by the movement module 10 originate from a same vibration source (i.e., the transducer 12) and are in the same phase, which enables the sound heard by the user through the acoustic device stronger and the acoustic device more power-efficient, thereby extending the endurance of the acoustic device. In addition, by designing the structure of the movement module 10, it is also possible to enable the air-conduction sound and bone-conduction sound produced by the movement module 10 to cooperate in terms of frequency response. For example, a low frequency band of the bone-conduction sound is compensated through the air-conduction sound. As another example, a medium frequency band and/or a mid-high frequency band of the bone-conduction sound is enhanced through the air-conduction sound. Therefore, the acoustic performance of the acoustic device in a particular frequency band may be improved. It should be noted that in the present disclosure, a frequency range corresponding to the low frequency band may be 20-150 Hz, a frequency range corresponding to the medium frequency band may be 150-5 kHz, a frequency range corresponding to the high frequency band may be 5 k-20 kHz, a frequency range corresponding to the mid-low frequency band may be 150-500 Hz, and a frequency range corresponding to the mid-high frequency bands may be 500-5 kHz.

It should be noted that since the housing 11 has a certain thickness, through holes (the sound outlet hole 113, a pressure relief hole 114, a sound modulation hole 117, etc.) opened on the housing 11 have a certain depth, so that each of these through holes has an inlet end close to the cavity and an outlet end away from the cavity. In some embodiments, an area of the outlet end of the sound outlet hole 113 may be greater than or equal to 8 $mm^2$ to ensure that the user hears the air-conduction sound of sufficient intensity. In some embodiments, an area of the inlet end of the hole 113 may be greater than or equal to the area of the outlet end of the hole 113.

In some embodiments, as shown in FIG. 5, the transducer 12 may include a coil support 121, a magnetic circuit system 122, a coil 123, and a spring sheet 124. The coil support 121 and the spring sheet 124 may be arranged in the first cavity 111. A central region of the spring sheet 124 may be connected to the magnetic circuit system 122, and two ends of the spring sheet 124 may be connected to the housing 11 through the coil support 121 to suspend the magnetic circuit system 122 in the housing 11. The coil 123 may be connected to the coil support 121 and extend into a gap of the magnetic circuit system 122. As shown in FIG. 3, the diaphragm 13 as a whole is located on a lower side of the transducer 12 and wrapped around a portion of a bottom wall and a side wall of the transducer 12. The diaphragm 13 is centrally symmetrical around a central axis (i.e., an axis passing through a center of the transducer and being parallel to the vibration direction) of the transducer 12. A portion of the diaphragm 13 close to the central axis is affixed to the bottom wall of the transducer 12, and an edge portion of the diaphragm 13 away from the central axis may be connected to the housing 11. In some embodiments, the edge portion of the diaphragm 13 away from the center axis may be connected to the coil support 121, in such cases, the coil support 121 may press the edge portion of the diaphragm 13 on the annular support platform 1153.

In some embodiments, as shown in FIG. 5, the magnetic circuit system 122 may include a guide magnetic cover 1221 and a magnet 1222. The guide magnetic cover 1221 and the magnet 1222 may cooperate to form a magnetic field. The guide magnetic cover 1221 may include a base plate 1223 and a side plate 1224. The base plate 1223 and the side plate 1224 may be integrally connected. The magnet 1222 may be arranged in the side plate 1224 and fixed to the base plate 1223. A side of the magnet 1222 away from the base plate 1223 may be connected to a middle region of the spring sheet 124 through a connector 1225. Merely by way of example, one end of the diaphragm 13 may be connected to the guide magnetic cover 1221 (e.g., the side plate 1224).

In some embodiments, as shown in FIG. 5, the diaphragm 13 may include a diaphragm body 131 and a reinforcement ring 136. Merely by way of example, a materiel of the diaphragm body 131 may include polycarbonate (PC), polyamides (PA), acrylonitrile butadiene styrene (ABS), polystyrene (PS), high impact polystyrene (HIPS), polypropylene (PP), polyethylene terephthalate (PET), polyvinyl chloride (PVC), polyurethane (PU), polyethylene (PE), phenol formaldehyde (PF), urea-formaldehyde (UF), melamine-formaldehyde (MF), polyarylate (PAR), polyetherimide (PEI), polyimide (PI), polyethylene naphthalate two formic acid glycol ester (PEN), polyetheretherketone (PEEK), silicone, or the like, or any combination thereof. In some embodiments, on the basis of having a certain structural strength to ensure the performance of the basic structure and fatigue resistance, etc., the softer the diaphragm body 131 is, the easier it is to deform elastically, and the smaller the impact on the transducer 12. In some embodiments, a thickness of the diaphragm body 131 may be less than or equal to 0.2 mm. In some embodiments, the thickness of the diaphragm body 131 may be less than or equal to 0.1 mm. In some embodiments, a hardness of the reinforcement ring 136 may be greater than a hardness of the diaphragm body 131, such that a structural strength of an edge of the diaphragm 13 is increased, thereby increasing a connection strength between the diaphragm 13 and the housing 11.

In some embodiments, since the first cavity 111 and the second cavity 112 are separated by structural members such as the diaphragm 13 and the transducer 12, a change law of the air pressure in the first cavity 111 is opposite to a change law of the air pressure in the second cavity 112, so that a change of the air pressure in the second cavity 112 may be blocked by the first cavity 111. Therefore, the housing 11 may be provided with at least one pressure relief hole 114 communicating with the first cavity 111. The at least one pressure relief hole 114 may be arranged in the first housing 116. Merely by way of example, as shown in FIG. 4, the at least one pressure relief hole 114 may be arranged in the side plate 1162. The at least one pressure relief hole 114 is arranged so that the first cavity 111 may be communicated with the external environment, i.e., air may freely enter and exit the first cavity 111. In this way, the change of the air pressure in the second cavity 112 may not be blocked by the first cavity 111, thereby effectively improving the acoustic performance of the air-conduction sound produced by the movement module 10. In some embodiments, to avoid or reduce a muffling situation of sounds output by the at least one pressure relief hole 114 and the sound outlet hole 113 produced due to opposite phases of the sounds, the at least one pressure relief hole 114 and the sound outlet hole 113 may be staggered (i.e., not adjacent) to each other, for example, the at least one pressure relief hole 114 may be arranged as far away from the sound outlet hole 113 as possible, and the at least one pressure relief hole 114 and the sound outlet hole 113 may be respectively located on opposite sides of the housing 11. In some embodiments, as shown in FIG. 3, an outlet end of at least a portion of the at least one pressure relief hole 114 may be covered with a first acoustic resistance mesh 1140. The first acoustic resistance mesh 1140 may improve the acoustic performance and the water and dust resistance of the acoustic device. More descriptions regarding the first acoustic resistance mesh 1140 may be found elsewhere in the present disclosure, e.g., FIG. 8 and the descriptions thereof. In some embodiments, as shown in FIG. 3 and FIG. 5, the coil support 121 may be provided with a hole 1214 communicating with the at least one pressure relief hole 114 to prevent the coil support 121 from blocking the communication between the at least one pressure relief hole 114 and the first cavity 111.

In some embodiments, as shown in FIG. 3, the movement module 10 may also include a sound conduction assembly 14 connected to the housing 11. The sound conduction assembly 14 may be provided with a sound conduction channel 141. The sound conduction channel 141 may be communicated with the sound outlet 113 to conduct the air-conduction sound transmitted outward through the sound outlet 113. The sound conduction assembly 14 may be used to change a propagation path and/or a direction of the air-conduction sound transmitted outward through the sound outlet hole 113, thereby changing the directivity of the air-conduction sound. The sound conduction assembly 14 may also be used to shorten a distance between the sound outlet hole 113 and the user's ear, thereby increasing tne intensity of the air-conduction sound. In addition, the sound conduction assembly 14 may cause an actual output location, on the acoustic device, of the air-conduction sound to be located away from a region where the base plate 1151 of the housing 11 is located, such that an anti-phase cancellation between the air-conduction sound output by the sound outlet hole 113 and possible sound leakage at the base plate 1151 is reduced, thereby improving the effect of the air-conduction sound heard by the user when wearing the acoustic device. In some embodiments, in the vibration direction of the transducer 12, a distance between an outlet end of the sound conduction channel 141 and the base plate 1151 of the housing 11 may be greater than or equal to 3 mm. In some embodiments, as shown in FIG. 3, the outlet end of the sound conduction channel 141 may be covered with a third acoustic resistance mesh 140. More descriptions regarding the third acoustic resistance mesh 140 may be found elsewhere in the present disclosure, e.g., FIG. 8 and the descriptions thereof. More descriptions regarding the sound conduction assembly 14 may be found elsewhere in the present disclosure, e.g., FIG. 7 and the description thereof.

It should be noted that the above descriptions of the movement module 10 and the components thereof (e.g., the housing 11, the transducer 12, the diaphragm 13, the at least one pressure relief hole 114, the sound conduction assembly 14, etc.) are merely provided for the purposes of illustration, and not intended to limit the scope of the present disclosure. For those skilled in the art, various amendments and variations may be made to the movement module 10 and the components thereof under the teachings of the present disclosure. These amendments and variations remain within the scope of the present disclosure.

In some embodiments, the bone-conduction sound output by the movement module 10 has at least one resonant peak. A resonant frequency of the resonant peak may satisfy an equation (1):

$$|f1-f2|/f1\leq 50\%, \quad (1),$$

where f1 refers to a resonant frequency of the resonant peak of the bone-conduction sound when the diaphragm 13 is connected to the transducer 12 and the housing 11, and f2 refers to a resonant frequency of the resonant peak of the bone-conduction sound when the diaphragm 13 is disconnected from either of the transducer 12 and the housing 11. |f1−f2|/f1 may be used to measure the influence of the diaphragm 13 on the movement of the skin-contact region 1160 of the housing 11 driven by the transducer 12. Merely by way of example, the smaller the |f1−f2|/f1 is, the smaller the influence is. In this way, on the basis of not affecting the resonance of the movement of the skin-contact region 1160 of the housing 11 driven by the transducer 12 as much as possible, the movement module 10 may simultaneously output the bone-conduction sound and the air-conduction sound with the same phase by introducing the diaphragm 13, thereby improving the acoustic performance of the movement module 10 and making the acoustic device more power-efficient. In some embodiments, a structural feature (e.g., structural strength and elasticity) of the diaphragm 13 may affect a difference (i.e., |f1−f2|) between a resonant frequency corresponding to f1 and a resonant frequency corresponding to f2. Specifically, the greater the structural strength and/or the elasticity of the diaphragm 13 is, the greater the |f1−f2| is, and the greater the effect of the diaphragm 13 on the movement of the skin-contact region 1160 of the housing 11 driven by the transducer 12. In some embodiments, by adjusting the structural strength and/or the elasticity of the diaphragm 13, the diaphragm 13 does not affect the movement of the skin-contact region 1160 of the housing 11 driven by the transducer 12, and the diaphragm 13 has a certain structural strength and elasticity to reduce a fatigue deformation during usage and extend the service life of the diaphragm 13. In some embodiments, to make the diaphragm 13 not affect the movement of the skin-contact region 1160 of the housing 11 driven by the transducer 12, the structural strength and/or the elasticity of the diaphragm 13 may be adjusted so that the difference between the resonant frequency corresponding to f1 and the resonant frequency corresponding to f2 is less than or equal to 50 Hz. In some embodiments, to make the diaphragm 13 have a certain structural strength and elasticity, the structural strength and/or the elasticity of the diaphragm 13 may be adjusted so that a difference between the resonant frequency corresponding to f1 and the resonant frequency corresponding to f2 is greater than or equal to 5 Hz.

Figure 6:
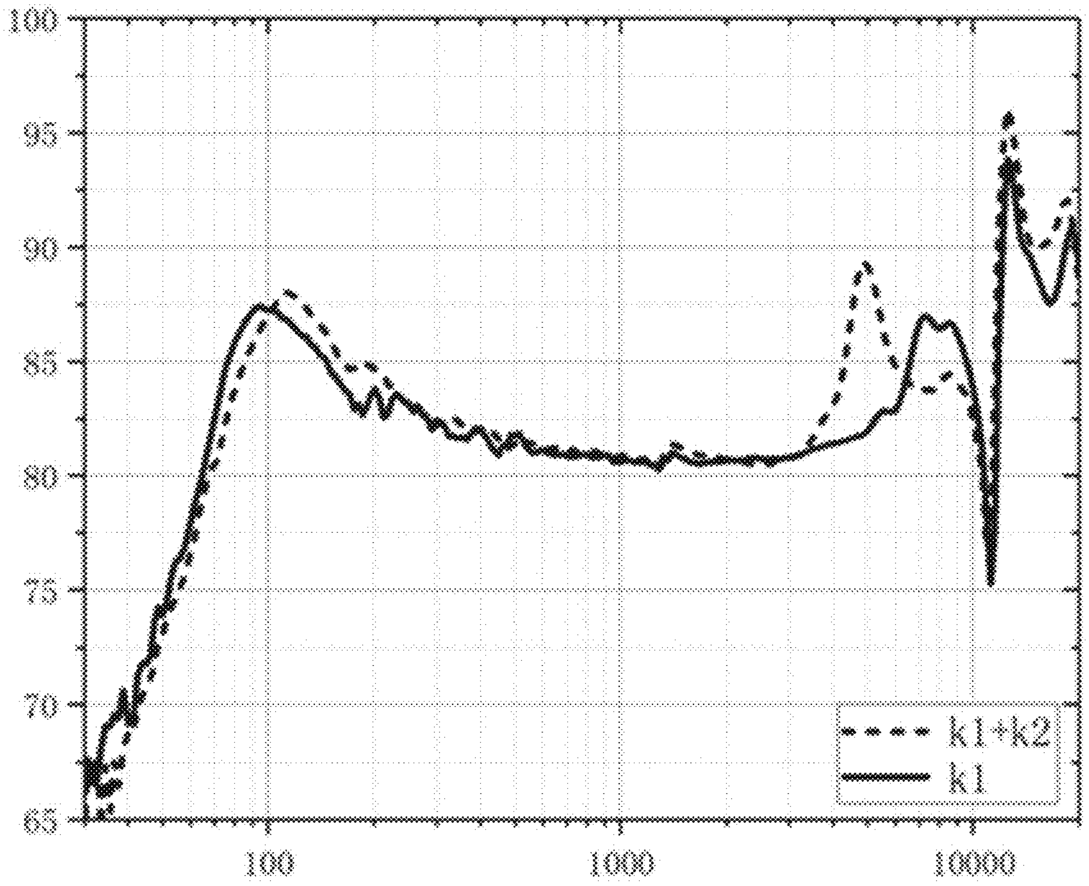
FIG. 6 is a schematic diagram illustrating a frequency response curve of a skin-contact region of a housing of a movement module according to some embodiments of the present disclosure.

FIG. 6 is a schematic diagram illustrating a frequency response curve of the skin-contact region 1160 of the housing 11 of the movement module 10 according to some embodiments of the present disclosure. As shown in FIG. 6, when the diaphragm 13 is connected to the transducer 12 and the housing 11, the skin-contact region 1160 of the housing 11 has a first frequency response curve (e.g., indicating by k1+k2 shown as in FIG. 6). When the diaphragm 13 is disconnected from either of the transducer 12 and the housing 11, the skin-contact region 1160 of the housing 11 has a second frequency response curve (e.g., indicating by k1 shown as in FIG. 6). In FIG. 6, a horizontal axis may indicate a frequency in Hz and a vertical axis may represent a sound intensity in dB. In some embodiments, as shown in FIG. 6, in the low frequency band or mid-low frequency band 500 Hz), a difference between a resonant frequency of a resonant peak corresponding to the first frequency response curve and a resonant frequency of a resonant peak corresponding to the second frequency response curve may be less than or equal to 5 dB.

Figure 7:
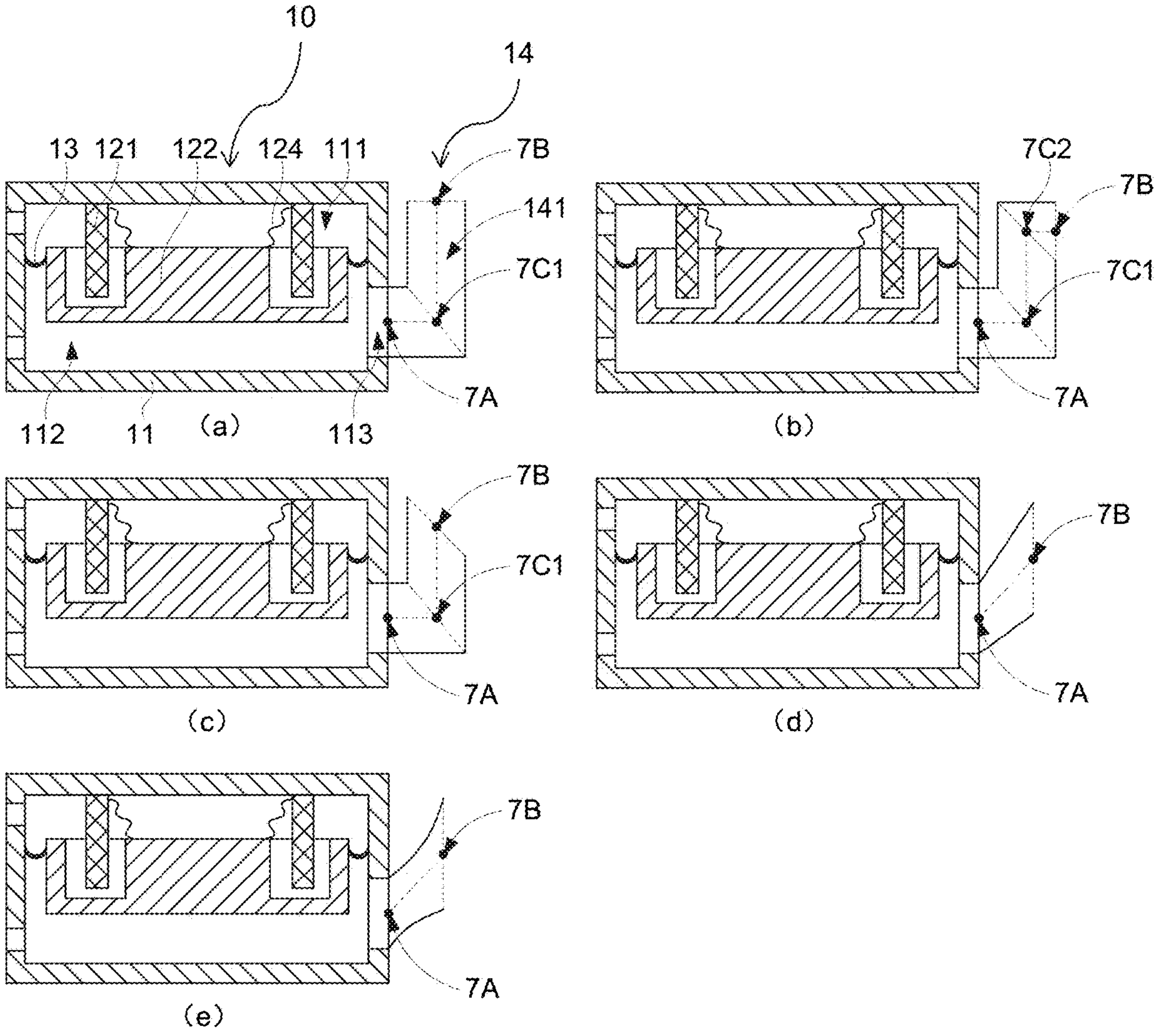
FIG. 7 is a schematic diagram illustrating cross-sectional structures of sound conduction assemblies according to some embodiments of the present disclosure.

FIG. 7 is a schematic diagram illustrating cross-sectional structures of sound conduction assembles according to some embodiments of the present disclosure. In some embodiments, the frequency response curve of the air-conduction sound transmitted outward through the sound outlet 113 may have a resonant peak. To ensure the sound quality, the frequency response curve of the air-conduction sound transmitted outward through the sound outlet 113 should be relatively flat on a wide frequency band, i.e., the resonant peak of the frequency response curve needs to be at a location of a higher frequency as much as possible. In order to make the acoustic device have a better voice output effect, the resonant frequency of the resonant peak may be greater than or equal to 1 kHz. In some embodiments, the resonant frequency of the resonant peak may be greater than or equal to 2 kHz. In some embodiments, the resonant frequency of the resonant peak may be greater than or equal to 3.5 kHz. In some embodiments, the resonant frequency of the resonant peak may be greater than or equal to 4.5.

The sound conduction channel 141 is communicated with the second cavity 112 through the sound outlet hole 113, which may form a typical Helmholtz resonant cavity. A relationship between a resonant frequency f of the Helmholtz resonant cavity and a volume V of the second cavity 112 and a cross-sectional area S, an equivalent radius R, and a length L of the sound conduction channel 141 may satisfy an equation (2).

$$f \propto [S/(VL+1.7VR)]^{1/2} \quad (2)$$

Therefore, for a given volume of the second cavity 112, an increase of the cross-sectional area of the sound conduction channel 141 and/or a decrease in the length of the sound conduction channel 141 is beneficial for increasing the resonant frequency, such that the resonant peak of the frequency response curve of the air-conduction sound transmitted outward through the acoustic outlet 113 moves to a higher frequency as much as possible. In some embodiments, the length of the sound conduction channel 141 may be less than or equal to 7 mm. In some embodiments, the length of the sound conduction channel 141 may be within a range of 2 mm to 5 mm. In some embodiments, the cross-sectional area of the sound conduction channel 141 may be greater than or equal to 4.8 $mm^2$. In some embodiments, the cross-sectional area of the sound conduction channel 141 may be greater than or equal to 8 $mm^2$. In some embodiments, the cross-sectional area of the sound conduction channel 141 may gradually increase in a transmission direction (i.e., a direction away from the sound outlet hole 113) of the air-conduction sound, such that the sound conduction channel 141 may be in a flared shape. In some embodiments, the sound conduction channel 141 may extend toward the first housing 116 to conduct the air-conduction sound transmitted outward from the sound outlet hole 113. In some embodiments, a cross-sectional area of an inlet end of the sound conduction channel 141 may be greater than or equal to 10 $mm^2$. In some embodiments, a cross-sectional area of an outlet end of the sound conduction channel 141 may be greater than or equal to 15 $mm^2$. It should be noted that the cross-sectional area of the sound conduction channel 141 may refer to a smallest area that may be intercepted when the sound conduction channel 141 is intercepted through a point on the sound conduction channel 141. For example, the cross-sectional area of the outlet end of the conduction channel 141 may refer to the smallest area that may be intercepted when the conduction channel 141 is intercepted through a point on the outlet end of the conduction channel 141. In some embodiments, a ratio of a volume of the sound conduction channel 141 to a volume of the second cavity 112 may be within a range of 0.05 to 0.9. In some embodiments, the volume of the second cavity 112 may be less than or equal to 400 $mm^3$. In some embodiments, the volume of the second cavity 112 may be within a range of 200 $mm^3$ to 400 $mm^3$.

Images (a)-(e) in FIG. 7 illustrates various structures of the sound conduction channel 141 of the sound conduction assembly 14. As shown in images (a)-(c) in FIG. 7, the sound conduction channel 141 may have a bent structure. A bent structure may refer to that the other end cannot be observed from either end of the inlet end and the outlet end of the sound conduction channel 141 or only a portion of the other end may be observed. The sound conduction channel of a bent structure may be divided into two or more sub-channels with a straight-through structure, and a sum of lengths of the sub-channels may be used as a length of the sound conduction channel of the bent channel. For example, as shown in images (a)-(c) in FIG. 7, a geometric center (e.g., points 7C1, 7C2) of a surface where a bend of the conduction channel is located are determined, and the geometric centers of the surfaces where the bends are located are connected to form line segments 7A-7C1 and 7C1-7B (or 7A-7C1, 7C1-7C2, and 7C2-7B), and a sum of lengths of the line segments may be used as the length of the conduction channel 141. As shown in images (d) and (e) in FIG. 7, the sound conduction channel 141 has a straight-through structure. The straight-through structure may refer to the other end that can be observed from either end of the inlet end and the outlet end of the sound conduction channel 141. For the sound conduction channel of the straight-through structure, in order to calculate the length of the sound conduction channel 141, a geometric center (e.g., a point 7A) of the inlet end of the sound conduction channel 141 and a geometric center (e.g., a point 7B) of the outlet end of the sound conduction channel 141 may be determined, and then the geometric center of the inlet end and the geometric center of the outlet end may be connected to form a line segment 7A-7B, and a length of the line segment may be used as the length of the sound conduction channel 141.

As shown in images (a)-(e) in FIG. 7, the outlet ends of the sound conduction channels 141 may point to the same or different directions. For example, as shown in images (a) and (c) in FIG. 7, the outlet ends of the sound conduction channels 141 may point to a direction away from the second cavity 112. As another example, as shown in images (b), (d), and (e) in FIG. 7, the outlet ends of the sound conduction channels 141 may point to a direction away from the movement module 10. As shown in images (a)-(e) in FIG. 7, shapes of the outlet ends of the sound conduction channels 141 may be the same or different. For example, as shown in images (a) and (b) in FIG. 7, the shapes of the outlet ends of the sound conduction channels 141 may be a plane (e.g., a horizontal plane, a vertical plane). As another example, as shown in images (c)-(e) in FIG. 7, the shapes of the outlet ends of the sound conduction channels 141 may be a slope so that an area of the outlet end of the sound conduction channel 141 is not limited by the cross-sectional area of the sound conduction channel 141, which increases the cross-sectional area of the sound conduction channel 141, thereby facilitating the output of the air-conduction sound. As shown in images (a)-(e) in FIG. 7, sidewalls of the sound conduction channels 141 may be a flat surface or a curved surface. For example, as shown in images (a)-(d) in FIG. 7, the sidewalls of the sound conduction channel 141 are a flat surface, which facilitates demolding during the manufacturing process of the sound conduction channel 141. For example, as shown in image (e) in FIG. 7, the sidewalls of the sound conduction channel 141 is a curved surface, which facilitates to realize a matching of the acoustic impedance of the sound conduction channel 141 and the atmosphere, thereby facilitating the output of the air-conduction sound.

It should be noted that the above descriptions of the sound conduction channel 141 are merely provided for the purposes of illustration, and do not limit the scope of the present disclosure. For those skilled in the art, various amendments and variations may be made to the sound conduction channel 141 under the teachings of the present disclosure. These amendments and variations remain within the scope of the present disclosure.

According to the descriptions of FIG. 3, the outlet end of the sound conduction channel 141 may be covered with the third acoustic resistance mesh 140. The third acoustic resistance mesh 140 may be configured to adjust an acoustic impedance of the air-conduction sound transmitted outward through the sound outlet 113 to weaken the resonant frequency of the resonant peak of the air-conduction sound in the mid-high frequency band or the high frequency band, so that the frequency response curve of the air-conduction sound is smoother and the user has a better listening effect. The third acoustic resistance mesh 140 also enables the second cavity 112 to be isolated from the outside to a certain extent, thereby increasing the waterproof and dustproof performance of the movement module 10. In some embodiments, the acoustic impedance of the third acoustic resistance mesh 140 may be less than or equal to 260 MKSrayls. In some embodiments, a porosity of the third acoustic resistance mesh 140 may be greater than or equal to 13%. In some embodiments, the porosity of the third acoustic resistance mesh 140 may be greater than or equal to 18 μm.

Figure 8:
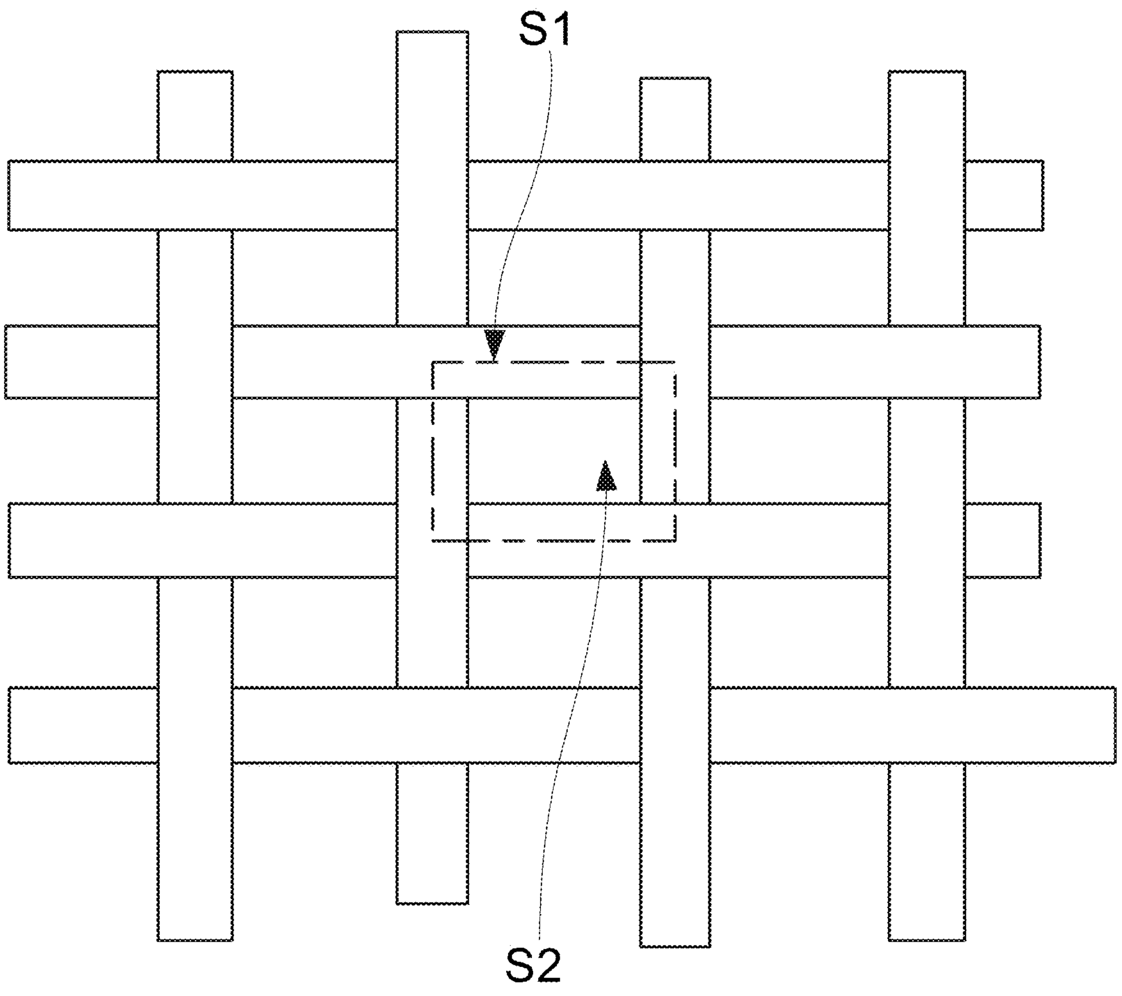
FIG. 8 is a schematic diagram illustrating an acoustic resistance mesh according to some embodiments of the present disclosure.

FIG. 8 is a schematic diagram illustrating an acoustic resistance mesh according to some embodiments of the present disclosure. As shown in FIG. 8, the acoustic resistance mesh (e.g., the first acoustic resistance mesh 1140, the third acoustic resistance mesh 140) may be woven from filaments. Merely by way of example, the filaments may include metal wires, yarns, etc. A diameter and density of the filaments may affect the acoustic impedance of the acoustic resistance mesh. As shown in FIG. 8, the acoustic resistance mesh may be formed by a plurality of filaments arranged at intervals in the longitudinal direction and the transverse direction. Every four intersecting filaments among the plurality of filaments may enclose a hole. In some embodiments, as shown in FIG. 8, an area of a region enclosed by centerlines of the filaments may be denoted S1, an area of a region (i.e., a pore) enclosed by edges of the filaments may be denoted S2, and a porosity of the acoustic resistance mesh may be denoted S2/S1. In some embodiments, a porosity size of the acoustic resistance mesh may be denoted as a spacing between any two adjacent filaments.

In the present disclosure, an effective area of a through hole (e.g., the pressure relief hole 114, the sound conduction channel 141) or an opening may refer to a product of an area (or referred to as an actual area) of the through hole or the opening and the porosity of the acoustic resistance mesh covering the through hole or the opening. For example, when the outlet end of the sound conduction channel 141 is covered with the third acoustic resistance mesh 140, the effective area of the outlet end of the sound conduction channel 141 may be a product of an area of the outlet end of the sound conduction channel 141 and the porosity of the third acoustic resistance mesh 140. When the outlet end of the sound conduction channel 141 is not covered with the third acoustic resistance mesh 140, an effective area of the outlet end of the sound conduction channel 141 may be the area of the outlet end of the sound conduction channel 141. As another example, when the outlet end of the pressure relief hole 114 is covered with the first acoustic resistance mesh 1140, an effective area of the outlet end of the pressure relief hole 114 may be a product of an area of the outlet end of the pressure relief hole 114 and the porosity of the first acoustic resistance mesh 1140. When the outlet end of the pressure relief hole 114 is not covered with the first acoustic resistance mesh 1140, an effective area of the outlet end of the pressure relief hole 114 may be the area of the outlet end of the pressure relief hole 114.

What is expected to be heard by the user is the air-conduction sound transmitted outward through the sound outlet hole 113 and the conduction channel 141, rather than the air-conduction sound transmitted outward through the relief hole 114 (i.e., the sound leakage at the relief hole 114). Therefore, the effective area of the outlet end of the conduction channel 141 may be greater than the effective area of the outlet end of each of the at least one pressure relief hole 114.

Figure 9:
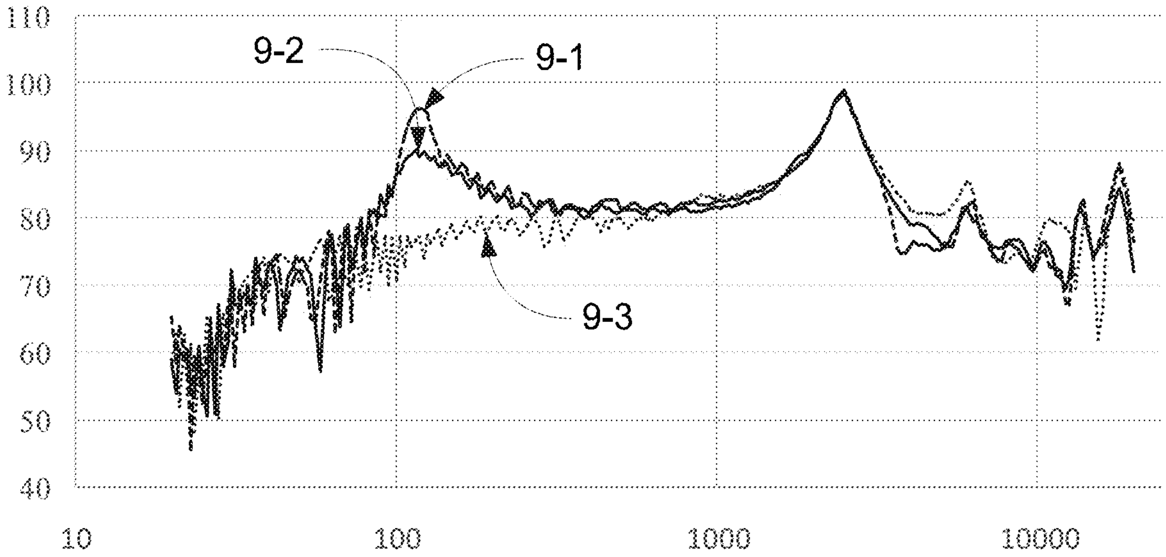
FIG. 9 is a schematic diagram illustrating frequency response curves of an air-conduction sound transmitted outward through a sound outlet hole according to some embodiments of the present disclosure.

A size of the pressure relief hole 114 affects the smoothness of the exhaust of the first cavity 111 and the degree of difficulty of the vibration of the diaphragm 13, thereby affecting the acoustic performance of the air-conduction sound transmitted outward through the sound outlet hole 113. In some embodiments, the adjustment of parameters of the relief hole 114, such as an actual area of the outlet end of the relief hole 114, the acoustic impedance of the first acoustic resistance mesh 1140 covered on the outlet end of the relief hole 114, the porosity of the first acoustic resistance mesh 1140, etc., may adjust the effective area of the outlet end of the relief hole 114, thereby causing the frequency response curve of the air-conduction sound transmitted outward through the sound outlet hole 113 to vary. For example, according to table 1, the adjustment of the actual area of the outlet end of the relief hole 114 and/or the acoustic impedance of the first acoustic resistance mesh 1140 covered on the outlet end of the relief hole 114 causes the frequency response curve of the air-conduction sound transmitted outward through the sound outlet hole 113 to vary (as shown in FIG. 9). It should be noted that in Table 1, an acoustic impedance of 0 may be regarded as that no first acoustic resistance mesh 1140 is covered.

TABLE 1

| Frequency Response Curve | Actual area/mm$^2$ | Acoustic impedance/ MKSrayls | Porosity |
|---|---|---|---|
| 9-1 | 31.57 | 0 | 100% |
| 9-2 | 2.76 | 0 | 100% |
| 9-3 | 2.76 | 1000 | 3% |

FIG. 9 is a schematic diagram illustrating frequency response curves of an air-conduction sound transmitted outward through the sound outlet hole 113 according to some embodiments of the present disclosure. As shown in FIG. 9, compared with 9-2, in 9-1, as the actual area of the outlet end of the pressure relief hole 114 increases, the exhaust of the first cavity 111 becomes smoother, and in the low frequency band or the mid-low frequency band, a resonant intensity of a resonant peak of the air-conduction sound transmitted outward through the sound outlet hole 113 increases significantly. As shown in FIG. 9, compared with 9-2, in 9-3, when the first acoustic resistance mesh 1140 is arranged on the outlet end of the pressure relief hole 114, the exhaust of the first cavity 111 is affected to a certain extent, and the mid-low frequency of the air-conduction sound transmitted outward through the sound outlet hole 113 decreases, and the frequency response curve is relatively flat.

Figure 10:
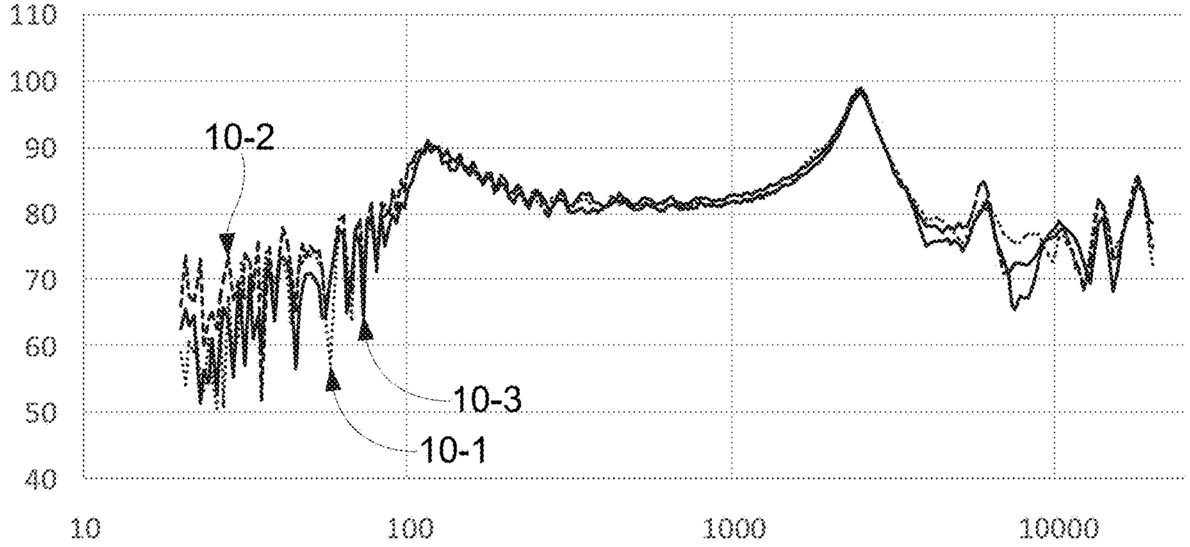
FIG. 10 is a schematic diagram illustrating frequency response curves of an air-conduction sound transmitted outward through a sound outlet hole according to some embodiments of the present disclosure.

The actual area of the outlet end of the relief hole 114 and/or the acoustic impedance of the first acoustic resistance mesh 1140 covered on the outlet end of the relief hole 114 may be adjusted to make the effective area of the outlet end of the relief hole 114 generally consistent. For example, as shown in Table 2, by comparing 10-1, 10-2, and 10-3, the larger the actual area of the outlet end of the relief hole 114, and the larger the acoustic impedance of the corresponding acoustic impedance mesh, finally the effective areas of the relief hole 114 corresponding to 10-1, 10-2 and 10-3 are substantially the same. As a result, even if the relief holes 114 have different actual areas and/or the acoustic impedances of the first acoustic impedance meshes 1140 of the relief holes 114 are different, the frequency response curves of the air-conduction sound transmitted outward through the sound outlet hole 113 are generally the same (as shown in FIG. 10). It should be noted that in Table 2, an acoustic impedance of 0 may be considered as that no first acoustic resistance mesh 1140 is covered, a first acoustic resistance mesh 1140 with a porosity of 14% may be a single layer mesh, and a first acoustic resistance mesh 1140 with a porosity of 7% may be formed by stacking two layers of mesh.

TABLE 2

| Frequency Response Curve | | Actual area/$mm^2$ | Acoustic impedance/ MKSrayls | Porosity | Count of layers |
|---|---|---|---|---|---|
| 10-1 | 11-1 | 2.76 | 0 | 100% | 0 |
| 10-2 | 11-2 | 31.57 | 145 | 14% | 1 |
| 10-3 | 11-3 | 71.48 | 290 | 7% | 2 |

Figure 11:
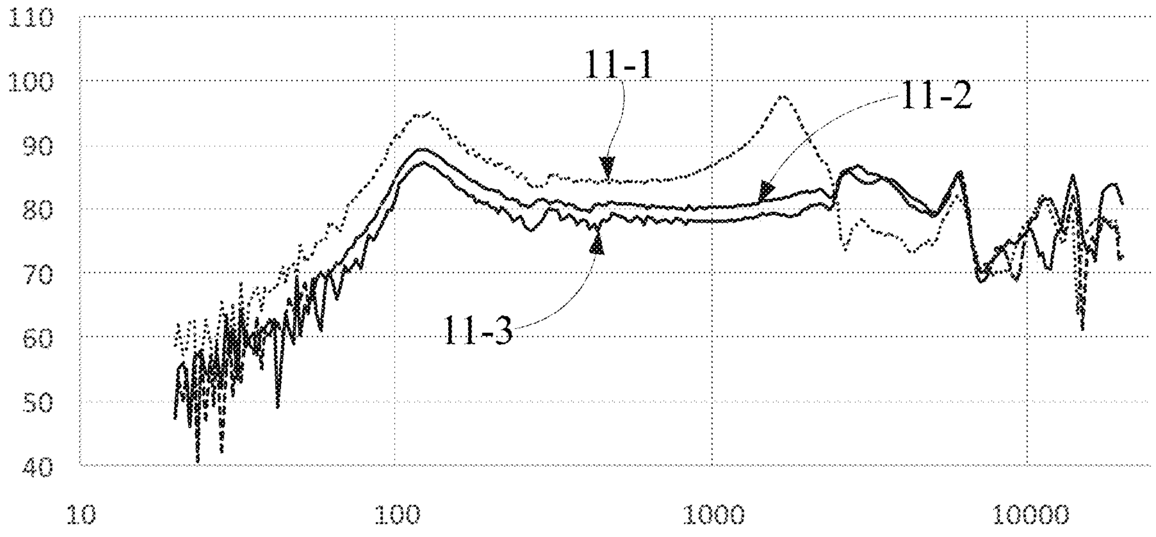
FIG. 11 is a schematic diagram illustrating frequency response curves of an air-conduction sound transmitted outward through a pressure relief hole according to some embodiments of the present disclosure.

FIG. 10 is a schematic diagram illustrating frequency response curves of an air-conduction sound transmitted outward through the sound outlet hole 113 according to some embodiments of the present disclosure. The effective areas of the pressure relief holes 114 corresponding to 10-1, 10-2, and 10-3 are generally consistent, such that the smoothness of the exhaust of the first cavities 111 corresponding to 10-1, 10-2, and 10-3 are generally consistent, and accordingly, the frequency response curves, corresponding to 10-1, 10-2 and 10-3, of the air-conduction sound transmitted outward through the sound outlet hole 113 are generally consistent. FIG. 11 is a schematic diagram illustrating frequency response curves of an air-conduction sound (i.e., the sound leakage at the relief hole 114) transmitted outward through the relief hole 114 according to some embodiments of the present disclosure. As shown in FIG. 11, although the frequency response curves, corresponding to 11-1, 11-2, and 11-3, of the air-conduction sound transmitted outward through the sound outlet hole 113 are generally consistent, the frequency response curves, corresponding to 11-1, 11-2 and 11-3, of the air-conduction sound (i.e., the sound leakage at the relief hole 114) transmitted outward through the relief hole 114 are different, i.e., the sound leakages at the relief hole 114 is not the same. As shown in FIG. 11, compared 11-1, 11-2, and 11-3, as the actual area of the outlet end of the relief hole 114 increases and the acoustic impedance of the first acoustic impedance mesh 1140 increases, the frequency response curve of the air-conduction sound (i.e., the sound leakage at the relief hole 114) transmitted outward through the relief hole 114 moves downward, i.e., the sound leakage at the relief hole 114 is weakened accordingly. Therefore, under the condition that the frequency response curve of the air-conduction sound (i.e., the air-conduction sound at the sound conduction assembly 14) transmitted outward through the sound outlet 113 is substantially unchanged, the size of the pressure relief hole 114 and/or the acoustic impedance of the first acoustic resistance mesh 1140 on the pressure relief hole 114 may be increased as much as possible to make the sound leakage at the pressure relief hole 114 as small as possible. However, due to the limited size of the housing 11, the pressure relief hole 114 may not be too large. Therefore, the at least one pressure relief hole 114 may be provided, for example, two, three, or more.

In some embodiments, in order to make the user hear the air-conduction sound transmitted outward through the sound outlet hole 113 instead of the air-conduction sound (i.e., the sound leakage at the pressure relief hole 114) transmitted outward through the pressure relief hole 114, the effective area and/or the actual area of the outlet end of the sound-conduction channel 141 may meet specific conditions. For example, the effective area of the outlet end of the sound conduction channel 141 is greater than the effective area of the outlet end of each of the at least one pressure relief hole 114. As another example, the actual area of the outlet end of the sound conduction channel 141 may be greater than the actual area of the outlet end of each of the at least one pressure relief hole 114. As yet another example, the effective area of the outlet end of the sound conduction channel 141 may be greater than or equal to a sum of the effective area of the outlet end of the at least one pressure relief hole 114. In some embodiments, a ratio between the sum of the effective area of the outlet end of the at least one pressure relief hole 114 and the effective area of the outlet end of the sound conduction channel 141 may be greater than or equal to 0.15. Merely by way of example, the sum of the effective area of the outlet end of the at least one pressure relief hole 114 may be greater than or equal to 2.5 $mm^2$. Such settings ensure the smoothness of the exhaust of the first cavity 111, improve the acoustic performance of the air-conduction sound transmitted outward through the hole 113, and reduce the sound leakage at the pressure relief hole 114.

In some embodiments, the actual area of the outlet end of the sound conduction channel 141 may be greater than or equal to 4.8 $mm^2$. In some embodiments, the actual area of the outlet end of the sound conduction channel 141 may be greater than or equal to 8 $mm^2$. In some embodiments, the actual area of the outlet end of the sound conduction channel 141 may be greater than or equal to 25.3 $mm^2$. In some embodiments, the actual area of the outlet end of the at least one pressure relief hole 114 may be greater than or equal to 2.6 mm. In some embodiments, the sum of the actual area of the outlet end of the at least one pressure relief hole 114 may be greater than or equal to 2.6 $mm^2$. In some embodiments, the sum of the actual area of the outlet end of the at least one pressure relief hole 114 may be greater than or equal to 10 $mm^2$. In some embodiments, the at least one pressure relief hole 114 may include three pressure relief holes, such as a first pressure relief hole, a second pressure relief hole, and a third pressure relief hole. Merely by way of example, the actual areas of the outlet ends of the first pressure relief hole, the second pressure relief hole, and the third pressure relief hole may be 11.4 $mm^2$, 8.4 $mm^2$, and 5.8 $mm^2$, respectively.

In some embodiments, the porosity of the first acoustic resistance mesh 1140 covering at the outlet end of at least a portion of the pressure relief holes 114 may be less than or equal to the porosity of the third acoustic resistance mesh 140 covering at the outlet end of the sound conduction channel 141. In some embodiments, the porosity of the first acoustic resistance mesh 1140 may be greater than or equal to 7%. In some embodiments, the porosity of the third acoustic resistance mesh 140 may be greater than or equal to 13%.

It should be noted that the above descriptions of the pressure relief hole 114, the sound conduction channel 141, and the acoustic resistance mesh (e.g., the first acoustic resistance mesh 1140, the third acoustic resistance mesh 140) are merely provided for the purposes of illustration, and do not limit the scope of the present specification. For those skilled in the art, various amendments and variations may be made to the above pressure relief hole 114, sound conduction channel 141, and acoustic resistance mesh under the teachings of the present disclosure. These amendments and variations remain within the scope of the present disclosure.

According to the descriptions in FIG. 7, the sound conduction channel 141 communicates with the second cavity 112 through the sound outlet hole 113, which may form a typical Helmholtz resonance cavity. A distribution of the sound pressure in the second cavity 112 during the resonance of the Helmholtz resonance cavity may be studied.

Figure 12A:
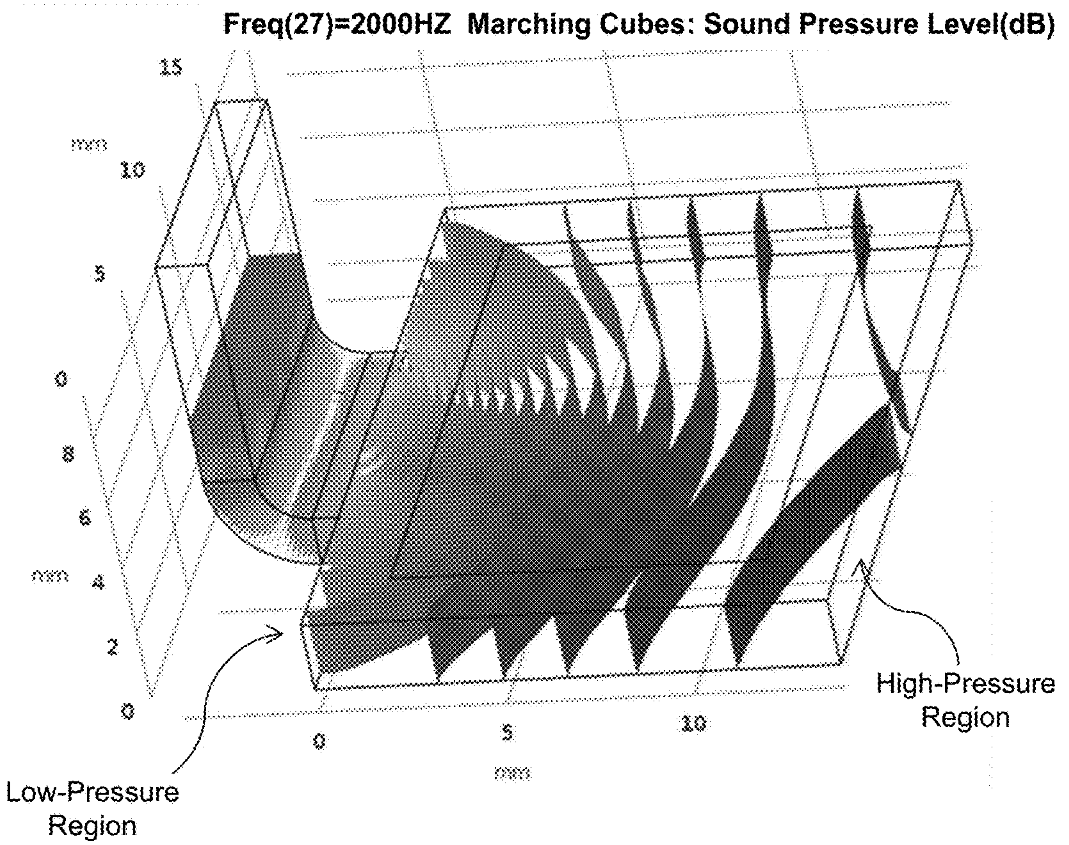
FIGS. 12A-12B are schematic diagrams each of which illustrates a sound pressure distribution in a second cavity according to some embodiments of the present disclosure.
Figure 12B:
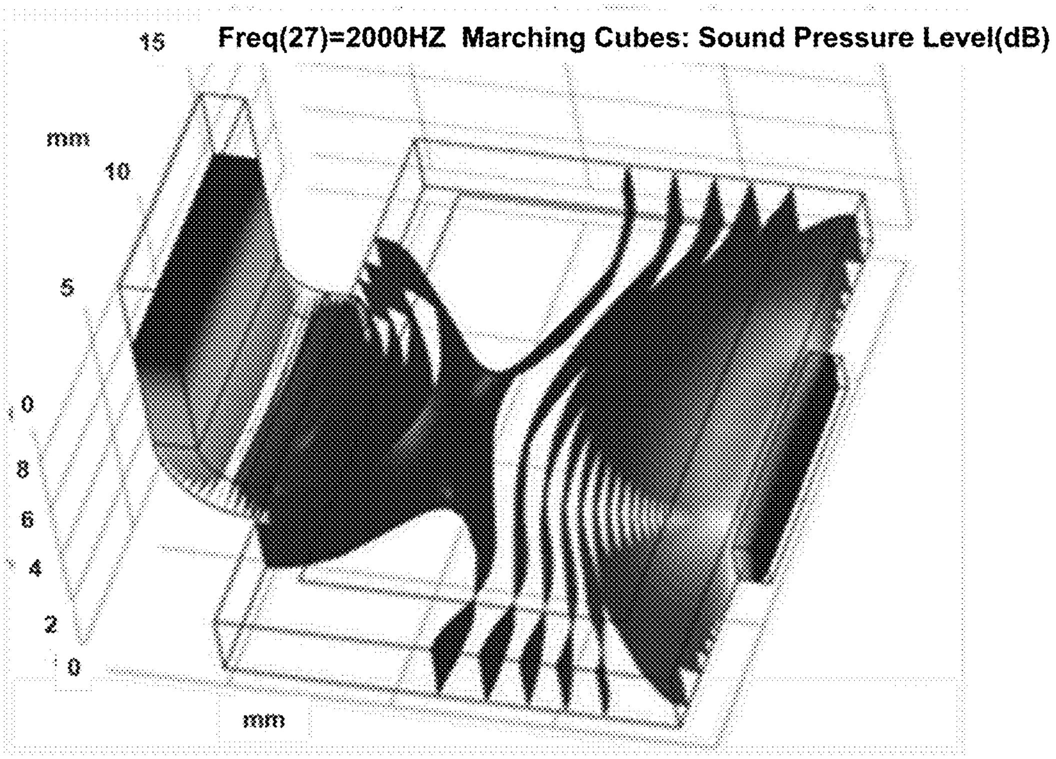

FIGS. 12A-12B are schematic diagrams each of which illustrates a distribution of sound pressure in the second cavity 112 according to some embodiments of the present disclosure. As shown in FIG. 12A, a high-pressure region away from the sound outlet hole 113 and a low-pressure region close to the sound outlet hole 113 may be formed in the second cavity 112. When the Helmholtz resonant cavity resonates, a standing wave may be considered to appear in the second cavity 112. A wavelength of the standing wave may be related to a size of the second cavity 112. For example, the deeper the second cavity 112 (i.e., the longer a distance between the low-pressure region and the high-pressure region), the longer the wavelength of the standing wave, which causes the lower resonant frequency of the Helmholtz resonant cavity. In some embodiments, by destroying the high-pressure region, the sound originally in the high-pressure region cannot be reflected, and such that the standing wave may not be formed. Merely by way of example, a through hole (e.g., a sound modulation hole) communicating with the second cavity 112 may be provided in the high-pressure region to destroy the high-pressure region. As shown in FIG. 12B, when the high-pressure region is destroyed, when the Helmholtz resonance cavity resonates, the high-pressure region in the second cavity 112 moves inward toward the low-pressure region, which causes the wavelength of the standing wave shorter, thereby increasing the resonant frequency of the Helmholtz resonance cavity.

In some embodiments, as shown in FIG. 3, the housing 11 may be provided with a sound modulation hole 117 communicating with the second cavity 112. In some embodiments, the sound modulation hole 117 may be arranged on the housing 11 and close to the high-pressure region in the second cavity 112, so that the sound modulation hole 117 may most effectively destroy the high-pressure region. In some embodiments, the sound modulation hole 117 may be arranged in other regions of the housing 11, for example, a region close to a region between the high-pressure region and the low-pressure region in the second cavity 112. Merely by way of example, the sound modulation hole 117 may be arranged in the second housing 115 and opposite to the sound outlet hole 113 and the sound conduction assembly 14 on both sides of the transducer 12.

In some embodiments, the frequency response curve of the air-conduction sound transmitted outward through the sound outlet hole 113 has a resonant peak. According to Table 3, In the case of not covering the acoustic resistance mesh, an actual area of an outlet end of the sound modulation hole 117 may be adjusted to control the damage of the sound modulation hole to the high-pressure region, and thereby adjusting the resonant frequency of the resonant peak of the air-conduction sound transmitted outward through the sound outlet hole 113. It should be noted that in Table 3, the actual area of the outlet end of the sound modulation hole 117 is 0, which may be regarded as the sound modulation hole 117 in a closed state.

TABLE 3

| Frequency Response Curve | Actual area/$mm^2$ |
|---|---|
| 13-1 | 0 |
| 13-2 | 1.7 |
| 13-3 | 2.8 |
| 13-4 | 28.44 |

Figure 13:
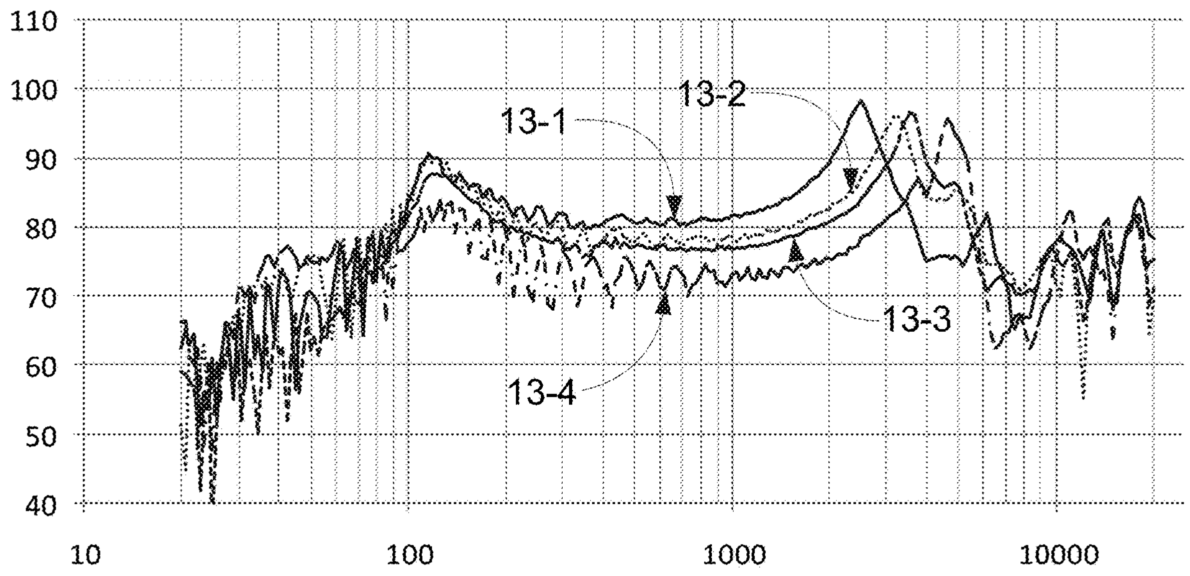
FIG. 13 is a schematic diagram illustrating frequency response curves of an air-conduction sound transmitted outward through a sound outlet hole according to some embodiments of the present disclosure.

FIG. 13 is a schematic diagram illustrating frequency response curves of an air-conduction sound transmitted outward through the sound outlet hole 113 according to some embodiments of the present disclosure.

As shown in FIG. 13, compared with 13-1 to 13-4, the larger the actual area of the outlet end of the sound modulation hole 117, the more obvious the damaging effect on the high-pressure region, and the higher the resonant frequency of the resonant peak of the air-conduction sound transmitted outward through the sound outlet hole 113. In some embodiments, compared with 13-1 and 13-2, relative to when the sound modulation hole 117 is a closed state, the resonant frequency of the resonant peak shifts to a higher frequency when the sound modulation hole 117 is in an open state, and a shift amount may be greater than or equal to 500 Hz. In some embodiments, compared with 13-1 and 13-3, the shift amount may be greater than or equal to 1 kHz. In some embodiments, compared with 13-1 and 13-4, the shift amount may be greater than or equal to 2 kHz. In some embodiments, as shown in FIG. 13, when the sound modulation hole 117 is in the open state, the resonant frequency of the resonant peak may be greater than or equal to 2 kHz, so that the acoustic device has a better music output effect. In some embodiments, when the sound modulation hole 117 is in the open state, the resonant frequency of the resonant peak may be greater than or equal to 3.5 kHz. In some embodiments, when the sound modulation hole 117 is in the open state, the resonant frequency of the resonant peak may be greater than or equal to 4.5 kHz.

Figure 14:
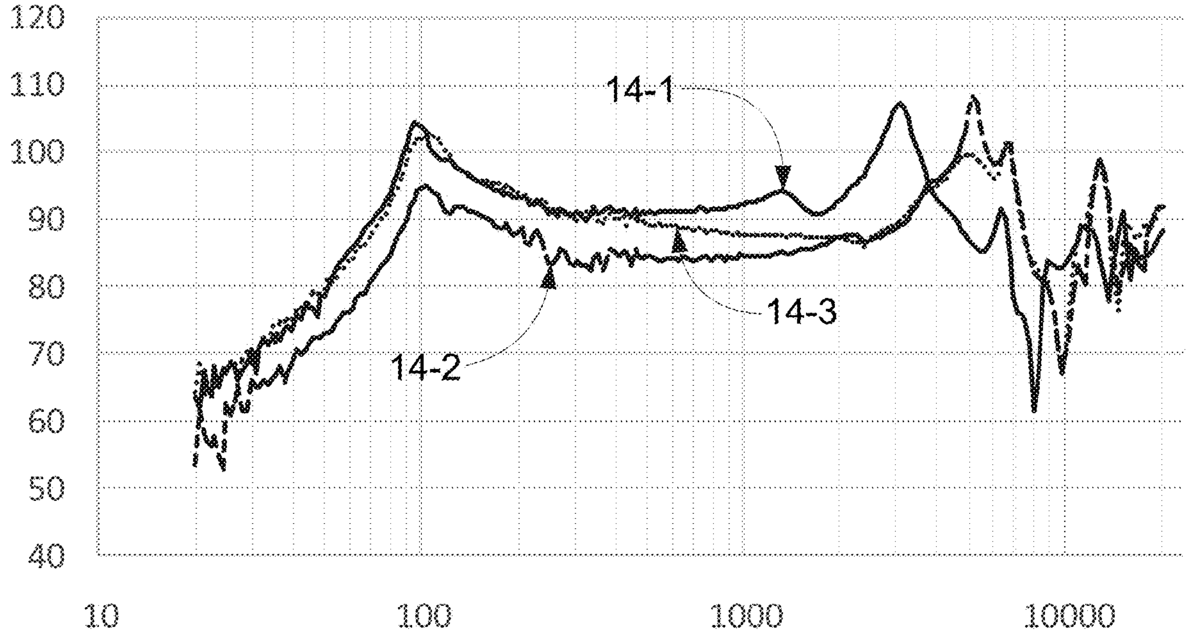
FIG. 14 is a schematic diagram illustrating frequency response curves of an air-conduction sound transmitted outward through a sound outlet hole according to some embodiments of the present disclosure.

In some embodiments, since the second cavity 112 is provided with a sound modulation hole 117, a portion of the sound leaks out from the sound modulation hole 117, so that sound leakage is formed at the sound modulation hole 117, which causes a downward shift of the frequency response curve of the air-conduction sound transmitted outward through the sound outlet hole 113. Therefore, an outlet end of at least a portion of sound modulation holes 117 may be covered with a second acoustic resistance mesh 1170 (as shown in FIG. 3). The second acoustic resistance mesh 1170 may improve the acoustic performance and waterproof and dustproof performance of the acoustic device, and reduce the sound leakage at the sound modulation hole 117 to a certain extent, so that the air-conduction sound may be transmitted outward through the sound outlet hole 113 more. In some embodiments, the adjustment of the parameters of the sound modulation hole 117, for example, the actual area of the outlet end of the sound modulation hole 117, the acoustic impedance of the second acoustic resistance mesh 1170 covered on the outlet end of the sound modulation hole 117, a porosity of the second acoustic resistance mesh 1170, etc., may adjust an effective area of the outlet end of the sound modulation hole 117, thereby changing the frequency response curve of the air-conduction sound transmitted outward through the sound outlet hole 113. For example, according to Table 4, the acoustic impedance of the second acoustic resistance mesh 1170 covered on the outlet end of the sound modulation hole 117 is adjusted, so that the frequency response curve of the air-conduction sound transmitted outward through the sound outlet hole 113 changes (as shown in FIG. 14). It should be noted that in Table 4, the acoustic impedance of 0 may be regarded as no second acoustic resistance mesh 1170 is covered.

TABLE 4

| Frequency Response Curve | Acoustic impedance/MKSrayls |
|---|---|
| 14-1 | No sound modulation hole |
| 14-2 | 0 |
| 14-3 | 145 |

FIG. 14 is a schematic diagram illustrating frequency response curves of an air-conduction sound transmitted outward through the sound outlet hole 113 according to some embodiments of the present disclosure. As shown in FIG. 14, compared with 14-1 and 14-2, after the sound modulation hole 117 is arranged, a resonant intensity of a resonant peak in the low frequency band of the air-conduction sound transmitted outward through the sound outlet hole 113 significantly reduces, i.e., the sound leakage is formed at the sound modulation hole 117, and a volume of the air-conduction sound transmitted outward through the sound outlet hole 113 is reduced. Compared with 14-2 and 14-3, after the second acoustic resistance mesh 1170 is covered on the outlet end of the sound modulation hole 117, a resonant intensity of a resonant peak in the low frequency band of the air-conduction sound transmitted outward through the sound outlet hole 113 significantly increases, i.e., the sound leakage at the sound modulation hole 117 is reduced, and the volume of the air-conduction sound transmitted outward through the sound outlet hole 113 is increased. Compared with 14-1, 14-2, and 14-3, after a second acoustic impedance mesh 1170 is covered on the outlet end of the sound modulation hole 117, a resonant intensity of a resonant peak in the high frequency band of the air-conduction sound transmitted outward through the sound outlet hole 113 reduces to a certain extent, so that the frequency response curve of the air-conduction sound is flatter in the high frequency band, and accordingly, the sound quality of the high frequency is more balanced.

It should be noted that due to the limited size of the housing 11, the sound modulation hole 117 may not be too large. Therefore, at least one sound modulation hole 117 may be provided, for example, two, three, or more.

In some embodiments, in order to make the user hear the air-conduction sound transmitted outward through the sound outlet hole 113 instead of the air-conduction sound (i.e., the sound leakage at the sound modulation hole 117) transmitted outward through the sound modulation hole 117, the effective area and/or the actual area of the outlet end of the sound-conduction channel 141 may meet specific conditions. For example, the effective area of the outlet end of the sound-conduction channel 141 may be greater than the effective area of the outlet end of each of the at least one of the sound modulation holes 117. As another example, the actual area of the outlet end of the sound conduction channel 141 may be greater than the actual area of the outlet end of each of the at least one of the sound modulation holes 117. As yet another example, the effective area of the outlet end of the conduction channel 141 may be greater than a sum of the effective area of the outlet end of at least one sound modulation hole 117. In some embodiments, a ratio between the sum of the effective area of the outlet end of the at least one sound modulation hole 117 and the effective area of the outlet end of the conduction channel 141 may be greater than or equal to 0.08. Merely by way of example, the sum of the effective area of the outlet end of the at least one sound modulation hole 117 may be greater than or equal to 1.5 $mm^2$. By such settings, the resonant frequency of the resonant peak of the air-conducted sound transmitted outward through the sound outlet hole 113 may move as far as possible towards the high frequency, and the sound leakage at the sound modulation hole 117 is reduced.

In some embodiments, the sum of the actual area of the outlet end of the at least one sound modulation hole 117 may be greater than or equal to 5.6 $mm^2$. In some embodiments, the at least one sound modulation hole 117 may include two sound modulation holes, such as a first sound modulation hole 1171 and a second sound modulation hole 1172. Merely by way of example, the actual areas of the outlet ends of the first sound modulation hole 1171 and the second sound modulation hole 1172 may be 7.6 $mm^2$ and 5.6 $mm^2$, respectively.

In some embodiments, a porosity of the second acoustic resistance mesh 1170 covering at the outlet end of the at least a portion of the at least one sound modulation hole 117 may be less than or equal to the porosity of the third acoustic resistance mesh 140 at least one the outlet end of the sound conduction channel 141. In some embodiments, the porosity of the third acoustic resistance mesh 140 may be greater than or equal to 13%. In some embodiments, the porosity of the second acoustic resistance mesh 1170 may be less than or equal to 16%.

In some embodiments, if a region where the sound outlet hole 113 is located is considered to be a low-pressure region in the second cavity 112, and a region in the second cavity 112 furthest from the region where the sound outlet hole 113 is located is considered to be a high-pressure region in the second cavity 112, the at least one sound modulation hole 117 may be arranged in the high-pressure region in the second cavity 112 to destroy the high-pressure region and move the high-pressure region toward the low-pressure region. Therefore, the at least one sound modulation hole 117 may be arranged as far away from the sound outlet hole 113 as possible.

In some embodiments, since the at least one pressure relief hole 114 communicates with the first cavity 111, and the at least one sound modulation hole 117 communicates with the second cavity 112, the air-conduction sound (i.e., the sound leakage at the at least one pressure relief hole 114 and the at least one sound modulation hole 117) transmitted outward through the at least one pressure relief hole 114 and the at least one sound modulation hole 117 has opposite phases. Therefore, the air-conduction sound transmitted outward through the at least one pressure relief hole 114 and the at least one sound modulation hole 117 may interfere with and cancel each other, thereby reducing the sound leakage at the at least one pressure relief hole 114 and the at least one sound modulation hole 117. In some embodiments, at least a portion of the at least one pressure relief hole 114 and at least a portion of the at least one sound modulation hole 117 may be arranged adjacent to each other. In some embodiments, in order to enhance the mutual interference and cancellation of the sound leakage at the pressure relief hole 114 and the sound modulation hole 117, a distance between the pressure relief hole 114 and the sound modulation hole 117 that are arranged adjacent may be as small as possible. For example, a distance between the outlet end of the pressure relief hole 114 and the sound modulation hole 117 that are arranged adjacent may be less than or equal to 2 mm.

Figure 15:
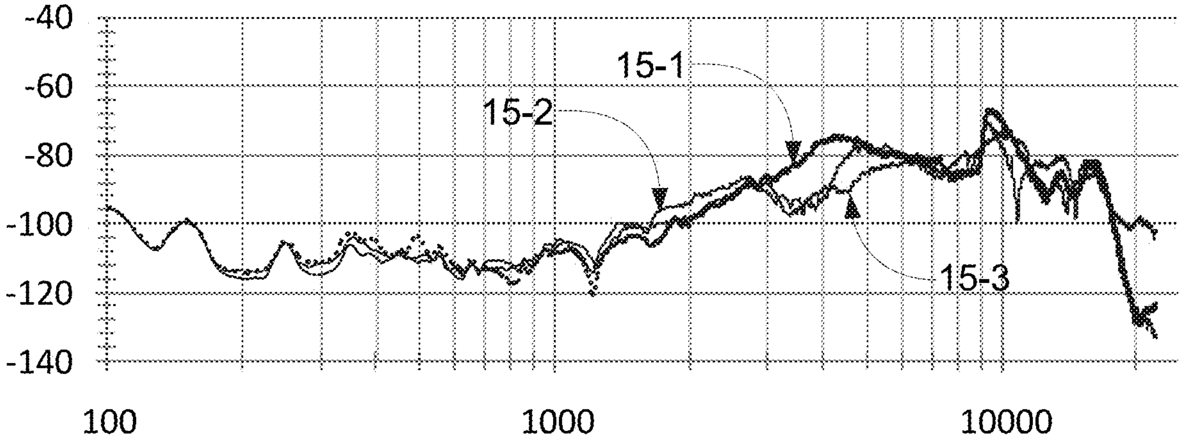
FIG. 15 is a schematic diagram illustrating frequency response curves of an air-conduction sound transmitted outward through a pressure relief hole and a sound modulation hole that are arranged adjacently according to some embodiments of the present disclosure.

In addition, the resonant frequency and/or resonant intensity of the resonant peak of the air-conduction sound (i.e., the sound leakage at the pressure relief hole 114 and sound modulation hole 117 that are arranged adjacent) transmitted outward through the pressure relief hole 114 and sound modulation hole 117 that are arranged adjacent should match as closely as possible (e.g., the same, not much different). FIG. 15 is a schematic diagram illustrating frequency response curves (e.g., 15-1, 15-2, and 15-3) of an air-conduction sound transmitted outward through the pressure relief hole 114 and sound modulation hole 117 that are arranged adjacent according to some embodiments of the present disclosure. Table 5 illustrates the resonant frequency of the resonant peak of the air-conduction sound transmitted outward through the relief hole 114 and the sound modulation hole 117 that are arranged adjacent obtained according to FIG. 15. As shown in Table 5, the air-conduction sound transmitted outward through the pressure relief hole 114 has a first resonant peak f1, and the air-conduction sound transmitted outward through the sound modulation hole 117 has a second resonant peak f2. In some embodiments, a resonant frequency of the first resonant peak f1 and a resonant frequency of the second resonant peak f2 may be greater than or equal to 2 kHz, and $|f1-f2|/f1 \leq 60\%$. In some embodiments, the resonant frequency of the first resonant peak f1 and the resonant frequency of the second resonant peak f2 may be greater than or equal to 3.5 k, and $|f1-f2| \leq 2$ kHz, such that the air-conduction sound transmitted outward through the pressure relief hole 114 and the modulation hole 117 interferes with and cancels each other as much as possible in the high frequency band. Compared with the frequency response curves 15-1, 15-2, and 15-3, differences between the resonant frequency of the first resonant peak f1 and the resonant frequency of the second resonant peak f2 gradually decrease, i.e., the frequency response curves 15-1, 15-2, and 15-3 tend to be flat gradually, which indicates that the frequency width of reducing sound leakage gradually widens, so that the sound leakage of the acoustic device is gradually decreased, i.e., an effect of the interference and cancellation of the air-conduction sound transmitted outward through the pressure relief hole 114 and the sound modulation hole 117 is better.

TABLE 5

| Frequency Response Curve | Resonant frequency of f1/Hz | Resonant frequency of f2/Hz |
|---|---|---|
| 15-1 | 3500 | 5600 |
| 15-2 | 4500 | 5600 |
| 15-3 | 5000 | 5600 |

In some embodiments, since the first cavity 111 is provided with structural members such as the coil support 121 and the spring sheet 124, etc., a wavelength of the standing wave in the first cavity 111 is relatively long, such that the resonant frequency of the first resonant peak f1 of the air-conduction sound transmitted outward through the pressure relief hole 114 communicating with the first cavity 111 is relatively small. The setting of the sound modulation hole 117 destroys the high-pressure region in the second cavity 112, so that the wavelength of the standing wave in the second cavity 112 is relatively short, and therefore the resonant frequency of the second resonant peak f2 of the air-conduction sound transmitted outward through the sound modulation hole 117 communicating with the second cavity 112 is relatively large. In such cases, the resonant frequency of the first resonant peak f1 is generally smaller than the resonant frequency of the second resonant peak f2. In order to make the air-conduction sound transmitted outward through the pressure relief hole 114 and the sound modulation hole 117 better interfere with and cancel each other, the resonant frequency of the first resonant peak f1 may be shifted to a high frequency as much as possible, so as to be as close as possible to the resonant frequency of the second resonant peak f2. Therefore, for the pressure relief hole 114 and the sound modulation hole 117 that are arranged adjacent, an effective area of the outlet end of the pressure relief hole 114 may be larger than the effective area of the outlet end of the sound modulation hole 117, and/or the actual area of the outlet end of the pressure relief hole 114 may be larger than the actual area of the outlet end of the sound modulation hole 117. Merely by way of example, for the pressure relief hole 114 and the sound modulation hole 117 that are arranged adjacent, a ratio between the effective area of the outlet end of the pressure relief hole 114 and the effective area of the outlet end of the sound modulation hole 117 may be less than or equal to 2. In some embodiments, the outlet ends of the pressure relief hole 114 and the sound modulation hole 117 that are arranged adjacent may be covered with a first acoustic resistance mesh 1140 and a second acoustic resistance mesh 1170, respectively. In some embodiments, a porosity of the first acoustic resistance mesh 1140 may be greater than a porosity of the second acoustic resistance mesh 1170.

Figure 16:
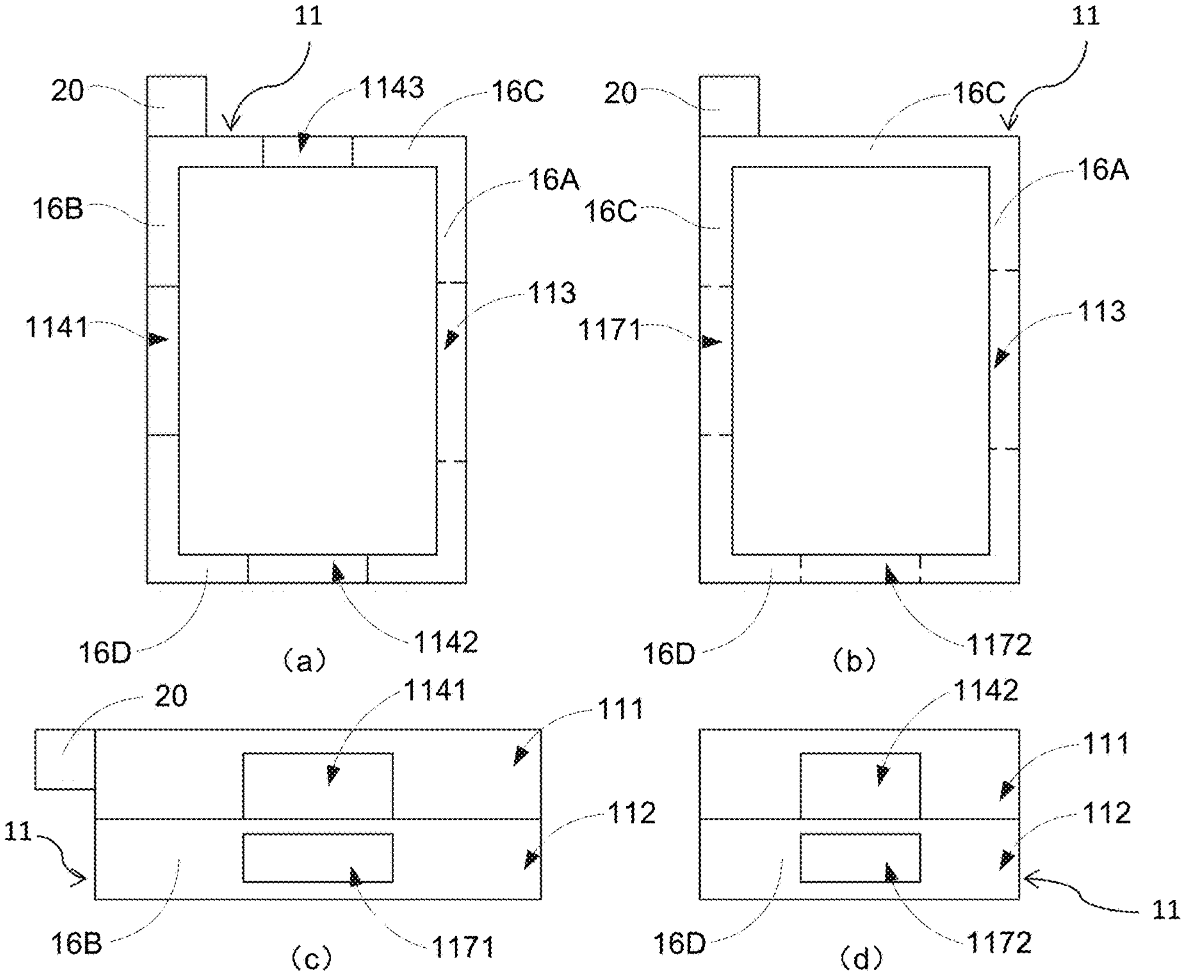
FIG. 16 is a schematic diagram illustrating a cross-sectional structure of a housing according to some embodiments of the present disclosure.

FIG. 16 is a schematic diagram illustrating a cross-sectional structure of a housing according to some embodiments of the present disclosure. Due to the limited size of the housing 11, the pressure relief hole 114 may not be too large, so in order to satisfy the exhaust requirement of the first cavity 111, two or more pressure relief holes may be provided. As shown in image (a) in FIG. 16, the at least one pressure relief hole 114 may include a first pressure relief hole 1141 and a second pressure relief hole 1142. In some embodiments, relative to the second pressure relief hole 1142, the first pressure relief hole 1141 may be arranged farther away from the sound outlet hole 113, and an area of an outlet end of the first pressure relief hole 1141 may be larger than an area of an outlet end of the second pressure relief hole 1142. By such settings, the first pressure relief hole 1141 with a relatively large exhaust volume (the outlet end of the first pressure relief hole 1141 has relatively large effective area) is arranged as far away from the sound outlet 113 as possible, which reduces the effect of sound leakage at all pressure relief holes 114 on the air conduction sound at the sound outlet 113. In some embodiments, as shown in image (a) in FIG. 16, the at least one pressure relief hole 114 may further include a third pressure relief hole 1143. In some embodiments, relative to the third pressure relief hole 1143, the first pressure relief hole 1141 may be located farther away from the sound outlet 113, and the area of the outlet end of the second pressure relief hole 1142 may be larger than an area of an outlet end of the third pressure relief hole 1143. In some embodiments, the sound outlet hole 113 and the first pressure relief hole 1141 may be located on two opposite sides of the transducer 12. The second pressure relief hole 1142 and the third pressure relief hole 1143 may be arranged opposite each other and located between the sound outlet hole 113 and the first pressure relief hole 1141.

According to the descriptions elsewhere in the present disclosure, when the outlet end of the pressure relief hole 114 is covered with the first acoustic resistance mesh 1140, an effective area of the outlet end of the pressure relief hole 114 may be a product of the area of the outlet end of the pressure relief hole 114 and a porosity of the first acoustic resistance mesh 1140. In some embodiments an outlet end of at least a portion of the at least one pressure relief hole 114 may be covered with the first acoustic resistance mesh 1140 to adjust the effective area of the outlet end of the at least one pressure relief hole 114. In some embodiments, an effective area of the outlet end of the first pressure relief hole 1141 may be greater than an effective area of the outlet end of the second pressure relief hole 1142. In some embodiments, the effective area of the outlet end of the second pressure relief hole 1142 may be greater than an effective area of the outlet end of the third pressure relief hole 1143.

Due to the limited size of the housing 11, the sound modulation holes 117 may not be too large, so in order to satisfy the requirement of destroying the high-pressure region of the second cavity 112 as much as possible, two or more sound modulation holes may be arranged. As shown in image (b) in FIG. 16, the at least one sound modulation hole 117 may include a first sound modulation hole 1171 and a second sound modulation hole 1172. In some embodiments, relative to the second sound modulation hole 1172, the first sound modulation hole 1171 may be arranged farther away from the sound outlet hole 113, and an actual area of an outlet end of the first sound modulation hole 1171 may be larger than an actual area of an outlet end of the second sound modulation hole 1172. By such settings, the first sound modulation hole 1171 which destroys the high-pressure region of the second cavity 112 is arranged as far away from the sound outlet hole 113 as possible, so that a resonant frequency of the air-conduction sound at the sound outlet hole 113 is as high as possible. In some embodiments, the actual area of the outlet end of the first sound modulation hole 1171 may be greater than or equal to 3.8 $mm^2$. In some embodiments, the actual area of the outlet end of the second sound modulation hole 1172 may be greater than or equal to 2.8 $mm^2$. In some embodiments, the sound outlet hole 113 and the first sound modulation hole 1171 may be located on two opposite sides of the transducer 12. The second sound modulation hole 1172 may be located between the sound outlet hole 113 and the first sound modulation hole 1171.

When the outlet end of the sound modulation hole 117 is covered with the second acoustic resistance mesh 1170, the effective area of the outlet end of the sound modulation hole 117 may be a product of the area of the outlet end of the sound modulation hole 117 and the porosity of the second acoustic resistance mesh 1170. In some embodiments, the outlet end of at least a portion of the at least one sound modulation hole 117 may be provided with a second acoustic resistance mesh 1170 to adjust the effective area of the outlet end of the at least one sound modulation hole 117. In some embodiments, the effective area of the outlet end of the first sound modulation hole 1171 may be greater than an effective area of the outlet end of the second sound modulation hole 1172.

In some embodiments, as shown in image (c) in FIG. 16, the first pressure relief hole 1141 and the first sound modulation hole 1171 may be arranged adjacent, such that the air-conduction sound transmitted outward through the first pressure relief hole 1141 and the first sound modulation hole 1171 may interfere with and cancel each other. In some embodiments, as shown in image (d) in FIG. 16, the second pressure relief hole 1142 and the second sound modulation hole 1172 may be arranged adjacent, such that the air-conduction sound transmitted outward through the second pressure relief hole 1142 and the second sound modulation hole 1172 may interfere with each other and cancel each other. In some embodiments, for the first pressure relief hole 1141 and the first sound modulation hole 1171 that are arranged adjacent, the effective area of the outlet end of the first pressure relief hole 1141 may be larger than the effective area of the outlet end of the first sound modulation hole 1171, so that the resonant frequency of the air-conduction sound transmitted outward through the first pressure relief hole 1141 moves as high as possible to be as close as possible to the resonant frequency of the air-conduction sound transmitted outward through the first sound modulation hole 1171, and thus the air-conduction sound transmitted outward through the first pressure relief hole 1141 and the first sound modulation hole 1171 may better interfere with and cancel each other. Similarly, the effective area of the outlet end of the second pressure relief hole 1142 may be larger than the effective area of the outlet end of the second sound modulation hole 1172.

In some embodiments, as shown in images (a) to (c) in FIG. 16, the housing 11 may include a first sidewall 16A and a second sidewall 16B spaced apart from each other, and a third sidewall 16C and a fourth sidewall 16D connected to the first sidewall 16A and the second sidewall 16B and spaced apart from each other. In short, the housing 11 may be simplified to a rectangular frame. The shape of the housing 11 is merely provided for the purposes of illustration, and not intended to limit the scope of the present disclosure. Merely by way of example, the housing 11 may be in other shapes, for example, the third sidewall 16C and the fourth sidewall 16D may be arranged in an arc shape, so that the housing 11 is shaped like a racetrack. In some embodiments, when the user wears the acoustic device, the first sidewall 16A is closer to the user's ear than the second sidewall 16B. In some embodiments, the third sidewall 16C is closer to the ear-hook assembly 20 than the fourth sidewall 16D. The sound outlet hole 113 may be arranged in the first sidewall 16A to facilitate the user to hear the air-conduction sound transmitted outward through the sound outlet hole 113. The first pressure relief hole 1141 and the first sound modulation hole 1171 may be arranged on the second sidewall 16B, so that the first pressure relief hole 1141 and the first sound modulation hole 1171 are far away from the sound outlet 113. The second pressure relief hole 1142 and the second sound modulation hole 1172 may be arranged on one of the third sidewall 17C and the fourth sidewall 17D, and the third pressure relief hole 1143 may be arranged on the other of the third sidewall 17C and the fourth sidewall 17D.

It should be noted that the above descriptions of the components such as the pressure relief hole 114 and the sound modulation hole 117 and their arrangement manners are merely provided for the purposes of illustration, and not intended to limit the scope of the present disclosure. For those skilled in the art, various amendments and variations may be made to these components and their arrangement manners under the teachings of the present disclosure. For example, the at least one pressure relief hole 114 may not include the third pressure relief hole 1143. As another example, the outlet end of a partial pressure relief hole 114 and/or a partial sound modulation hole 117 may not be covered with the acoustic resistance mesh. These amendments and variations remain within the scope of the present disclosure.

Figure 17:
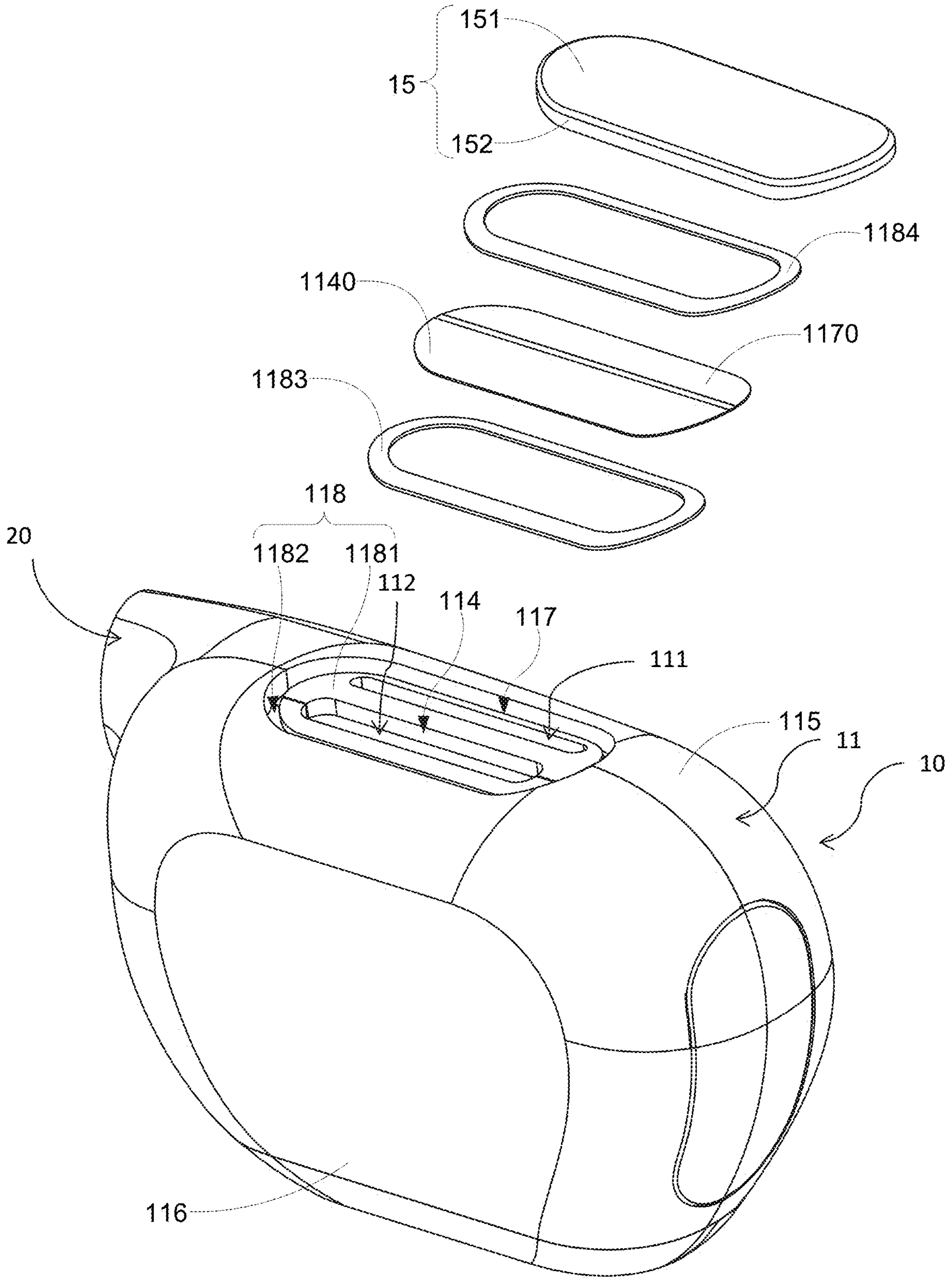
FIG. 17 is a schematic diagram illustrating an exploded structure of a movement module 10 according to some embodiments of the present disclosure.

FIG. 17 is a schematic diagram illustrating an exploded structure of a movement module according to some embodiments of the present disclosure. As shown in FIG. 17, the housing 11 of the movement module 10 is provided with a pressure relief hole 114 communicating with the first cavity 111 and a sound modulation hole 117 communicating with the second cavity 112, and the pressure relief hole 114 and the sound modulation hole 117 may be arranged adjacently. In some embodiments, as shown in FIG. 3 and FIG. 17, the movement module 10 may include a protective cover 15. The protective cover 15 may cover periphery of the relief hole 114 and sound modulation hole 117 that are arranged adjacently. In some embodiments, the protective cover 15 may be a mesh structure made of woven fine wire. Merely by way of example, the fine wire may be metal or plastic wire of a certain strength. The fine wire may have a certain diameter. For example, a diameter of the fine wire may be less than or equal to 0.1 mm. The mesh structure may have a certain mesh number. For example, the mesh number of the protective cover 15 may be 90-100. By such settings, the protective cover 15 has a certain structural strength and good air permeability, besides, the intrusion of foreign objects into the movement module 10 may be reduced or avoided while the acoustic performance of the acoustic device is not affected. In addition, the protective cover 15 covers both the pressure relief holes 114 and sound modulation holes 117 that are arranged adjacent, which may reduce the materials for making the acoustic device and improve the appearance quality of the acoustic device.

In some embodiments, as shown in FIG. 17, an outer surface of the housing 11 may be provided with a containing region 118. The containing region 118 may communicate with an outlet end of the pressure relief hole 114 and the sound modulation hole 117 that are arranged adjacently. In some embodiments, the protective cover 15 may be physically connected (e.g., snap-fitting, bonding, welding, etc.) to the housing 118. For example, the protective cover 15 may be arranged in a plate shape and bonded to a bottom of the containing region 118. In some embodiments, an outer surface of the protective cover 15 may be flush or have a circular arc transition with an outer surface of the housing 11 to improve the appearance quality of the acoustic device.

In some embodiments, as shown in FIG. 17, a bulge 1181 may be formed inside the containing region 118. The bulge 1181 and a side wall of the containing region 118 may be spaced to form a containing groove 1182 surrounding the bulge 1181. Merely by way of example, a width of the containing groove 1182 may be less than or equal to 0.3 mm. In some embodiments, the outlet ends of the pressure relief hole 114 and the sound modulation hole 117 may be located on top of the bulge 118, i.e., the containing groove 1182 may surround the pressure relief hole 114 and the sound modulation hole 117.

In some embodiments, as shown in FIG. 17, the protective cover 15 may include a main cover plate 151 and an annular side plate 152. The annular side plate 152 may be bent and connected to an edge of the main cover plate 151 and extend along the direction of the sidewall of the main cover plate 151. Merely by way of example, the extension height of the annular side plate 152 along the direction of the sidewall of the annular side plate 152 may be within a range between 0.5 mm and 1.0 mm. In some embodiments, when the protective cover 15 is fixed in the containing region 118, the extended portion of the annular side plate 152 may be inserted and fixed in the containing groove 1182, which may increase the connection strength between the protective cover 15 and the housing 11. In some embodiments, in the containing groove 1182, the annular side plate 152 may be physically connected (e.g., bonding) to the housing 11. For example, the containing groove 1182 may be provided with an adhesive, and the annular side panel 152 may be connected to the housing 11 through the adhesive in the containing groove 1182. In some embodiments, the main cover plate 151 may be physically connected (e.g., welding) to the top of the bulge 1181. In addition, the top of the bulge 1181 may be slightly lower than the outer surface of the housing 11, e.g., a height difference between the top of the bulge 1181 and the outer surface of the housing 11 may be approximately equal to a thickness of the main cover plate 151, such that when the protective cover 15 is fixed in the containing region 118, the outer surface of the main cover plate 151 is flush with the outer surface of the housing 11, thereby improving the appearance quality of the acoustic device.

In some embodiments, the outlet end of the pressure relief hole 114 may be covered with a first acoustic resistance mesh 1140 and/or the outlet end of the sound modulation hole 117 may be covered with a second acoustic resistance mesh 1170 to adjust an effective area of the outlet end of the pressure relief hole 114 and the sound modulation hole 117 and improve the acoustic performance of the acoustic device. In some embodiments, when the outlet end of the pressure relief hole 114 is covered with the first acoustic resistance mesh 1140 and/or the outlet end of the sound modulation hole 117 is covered with the second acoustic resistance mesh 1170, the movement module 10 may include a first annular film 1183. The first annular film 1183 may surround the pressure relief hole 114 and the sound modulation hole 117, and the outlet end of the pressure relief hole 114 and/or the outlet end of the sound adjustment hole 117 may be exposed. The first acoustic resistance mesh 1140 and/or the second acoustic resistance mesh 1170 may be fixed to the top of the bulge 1181 through the first annular film 1183. Further, the protective cover 15 may be located on a side of the first acoustic resistance mesh 1140 and/or the second acoustic resistance mesh 1170 away from the bulge 1181 and fixed in the containing region 118. For example, the movement module 10 may include a second annular film 1184. The second annular film 1184 may surround the pressure relief hole 114 and the acoustic sound modulation hole 117. The main cover plate 151 of the protective cover 15 may be fixed to the side of the first acoustic resistance mesh 1140 and/or the second acoustic resistance mesh 1170 away from the bulge 1181 through the second annular film 1184. In some embodiments, a width of the first annular film 1183 or the second annular film 1184 may be within a range between 0.4 mm and 0.5 mm. A thickness of the first annular film 1183 or the second annular film 1184 may be less than or equal to 0.1 mm.

In some embodiments, the first acoustic resistance mesh 1140 and/or the second acoustic resistance mesh 1170 may be pre-fixed to the protective cover 15 to form a structural assembly with the protective cover 15, and then the structural assembly may be fixed in the containing region 118. For example, the first acoustic resistance mesh 1140 and/or the second acoustic resistance mesh 1170 may be fixed to a side of the main cover plate 151 of the protective cover 15 where the annular side plate 152 is located through the second annular film 1184 and surrounded by the annular side plate 152.

In some embodiments, when the outlet ends of the pressure relief hole 114 and the sound modulation hole 117 are covered with the first acoustic resistance mesh 1140 and the second acoustic resistance mesh 1170, respectively, the first acoustic resistance mesh 1140 and the second acoustic resistance mesh 1170 may be at least partially spaced from each other to facilitate respectively covering the outlet ends of the pressure relief holes 114 and sound modulation holes 117 that are arranged adjacent and adapt to the distance between the pressure relief holes 114 and sound modulation holes 117 that are arranged adjacently.

In some embodiments, one end of the sound conduction assembly 14 away from the housing 11 may be provided with a protective cover. The arrangement manner of the protective cover may be the same or similar to the arrangement manner of the protective cover 15 covering the outlet end of the pressure relief hole 114 and the sound modulation hole 117 that are arranged adjacent, which will not be repeated herein. In some embodiments, an outlet end of the sound conduction assembly 14 may be covered with a third acoustic resistance mesh 140, which may be arranged in the same or similar to the first acoustic resistance mesh 1140 and/or the second acoustic resistance mesh 1170 described above, which will not be repeated herein.

It should be noted that the above descriptions of the components such as the protective cover 15, the containing region 118, and the acoustic resistance mesh (e.g., the first acoustic resistance mesh 1140, the second acoustic resistance mesh 1170) and their arrangement manners are merely provided for the purposes of illustration, and do not limit the scope of the present specification. For those skilled in the art, various amendments and variations may be made to these components and their arrangement manners under the teachings of the present disclosure. For example, the movement module 10 may not include the first annular film 1183 and/or the second annular film 1184, and the first acoustic resistance mesh 1140 and/or the second acoustic resistance mesh 1170 may be fixed to the bulge 1181 and the main cover plate 151 of the protective cover 15 through other connection manners (e.g., welding). As another example, the outlet ends of the pressure relief hole 114 and the sound modulation hole 117 may not be covered with the acoustic resistance mesh, and the main cover plate 151 of the protective cover 15 may be fixed directly to the bulge 1181. These amendments and variations remain within the scope of the present disclosure.

Figure 18:
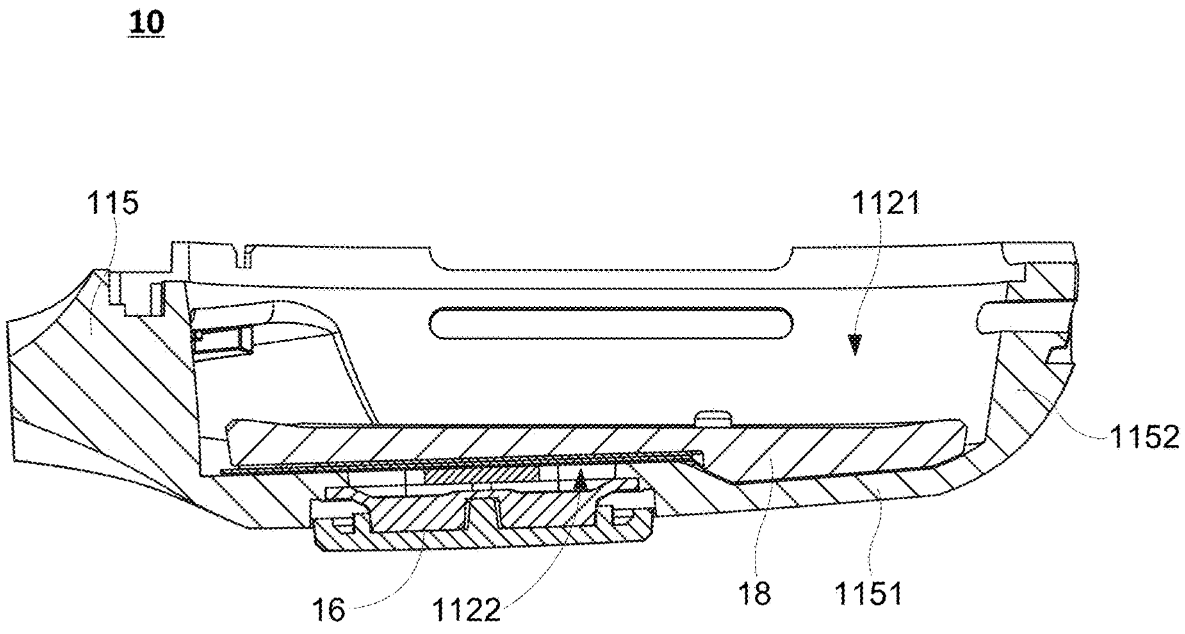
FIG. 18 is a schematic diagram illustrating a cross-sectional structure of the movement module 10 according to some embodiments of the present disclosure.
Figure 19:
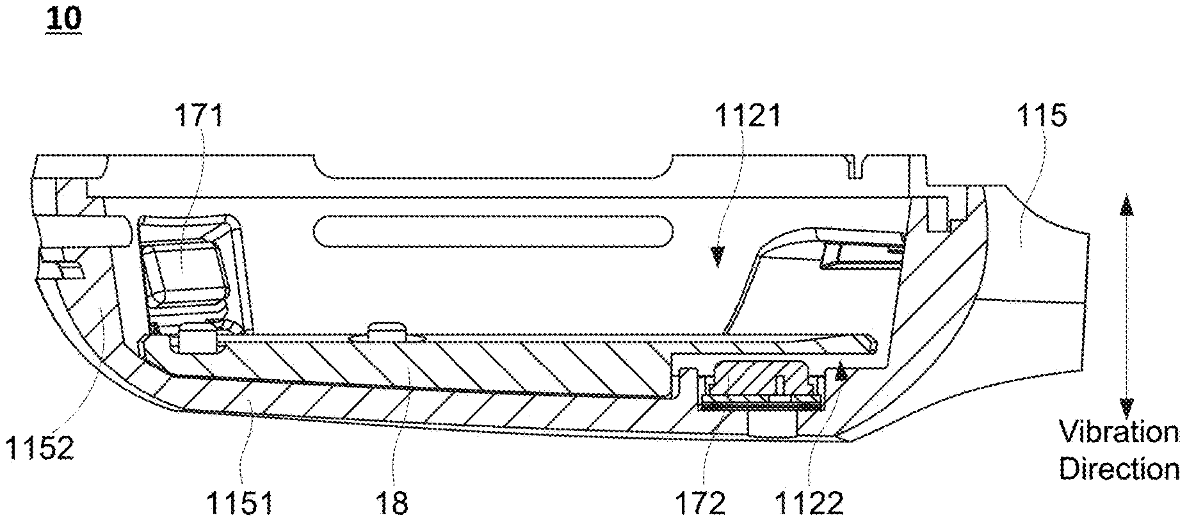
FIG. 19 is a schematic diagram illustrating a cross-sectional structure of the movement module 10 according to some embodiments of the present disclosure.

According to the descriptions in FIG. 2, the acoustic device (e.g., the acoustic device 100) includes two movement modules 10, and when the acoustic device is in a worn state, the two movement modules 10 may be located on the left and right sides of the user's head, respectively. In some embodiments, the two movement modules 10 may include a first movement module and a second movement module. The first movement module and the second movement module may have the same or different structures. FIG. 18 is a schematic diagram illustrating a cross-sectional structure of a movement module according to some embodiments of the present disclosure. FIG. 19 is a schematic diagram illustrating a cross-sectional structure of a movement module according to some embodiments of the present disclosure. In some embodiments, when the first movement module and the second movement module have the same structure, the structure of the first movement module and the second movement module may be as shown in FIG. 18 or 19. In some embodiments, when the first movement module and the second movement module have different structures, the structures of the first movement module and the second movement module may be as shown in FIGS. 18 and 19, respectively. In some embodiments, as shown in FIG. 18 and FIG. 19, in addition to arranging structural members related to sound generation such as the transducer 12, the movement module 10 (e.g., the first movement module, the second movement module) may be provided with an auxiliary device (e.g., a button, a microphone, a communication element, etc.) to enrich and expand the function of the acoustic device. More descriptions regarding the auxiliary device may be found elsewhere in the present disclosure, e.g., FIG. 2 and the descriptions thereof. In some embodiments, when the first movement module and the second movement module have different structures, one of the first movement module and the second movement module may be provided with the auxiliary device and the other may be provided with no auxiliary devices. In some embodiments, the first movement module and the second movement module may both be provided with the auxiliary device, and the auxiliary device arranged in the first movement module may be the same as or different from that arranged in the second movement module. For example, the auxiliary device in the first movement module may be a button, and the auxiliary device in the second movement module may be a microphone. As another example, the auxiliary device in the first movement module may be a button and a microphone, and the auxiliary device in the second movement module may be a microphone.

Merely by way of example, as shown in FIG. 18, the movement module 10 may include a button 16 arranged on the housing 11. The button 16 may be exposed from the second housing 115 so as to facilitate the user to press the button 16. In some embodiments, a pressing direction of the button 16 may be consistent with the vibration direction of the transducer 12.

Merely by way of example, as shown in FIG. 19, the movement module 10 may include a first microphone 171. The first microphone 171 may collect sound outside the movement module 10. In some embodiments, the first microphone 171 may be arranged in a cavity of the housing 11. In some embodiments, an angle between a vibration direction of the first microphone 171 and a vibration direction of the transducer 12 may be within a range between 65 degrees and 115 degrees, which may reduce or avoid mechanical resonance of the first microphone 171 with the vibration of the transducer 12, thereby improving the sound pickup effect of the movement module 10. In some embodiments, the angle between the vibration direction of the first microphone 171 and the vibration direction of the transducer 12 may be 90 degrees (i.e., being perpendicular to each other).

In some embodiments, as shown in FIG. 19, the movement module 10 may further include a second microphone 172. The second microphone 172 may collect sound outside the movement module 10. In some embodiments, the second microphone 172 may be arranged in the cavity of the housing 11. In some embodiments, an angle between a vibration direction of the second microphone 172 and the vibration direction of the first microphone 171 may be within a range between 65 degrees and 115 degrees, so that the second microphone 172 and the first microphone 171 may collect sound from a same source in two different directions, thereby improving the noise reduction capability of the acoustic device, and accordingly improving the voice call effect of the acoustic device. In some embodiments, the angle between the vibration direction of the second microphone 172 and the vibration direction of the first microphone 171 may be 90 degrees (i.e., being perpendicular to each other). In some embodiments, the first microphone 171 and the second microphone 172 may be welded on a same flexible circuit board, which may simplify a circuit structure of the movement module 10.

In some embodiments, the acoustic device may also include a processing circuitry (not shown). The processing circuit may perform a noise reduction on a voice signal collected by the first microphone 171 based on a voice signal collected by the second microphone 172. For example, the processing circuit may use the first microphone 171 as a main microphone for collecting the user's voice, and uses the second microphone 172 as an auxiliary microphone for collecting ambient noise of the user's environment. The user's voice collected by the first microphone 171 may include the ambient noise of the user's environment. Further, the processing circuit may remove signals associated with the ambient noise of the user's environment collected by the second microphone 172 from the user's voice collected by the first microphone 171, thereby achieving the noise reduction of the user's voice collected through the first microphone 171. In some embodiments, the processing circuitry may be integrated into the master control circuit board 40.

In some embodiments, as shown in FIG. 18 and FIG. 19, the movement module 10 may also include a baffle plate 18. The baffle plate 18 may be arranged in the second cavity 112 to divide the auxiliary device from the second cavity 112, such that the second cavity 112 is free from the auxiliary device. The transducer 12 may be located on a side of the baffle plate 18 toward the first cavity 111. Merely by way of example, the baffle plate 18 may divide the second cavity 112 into a first sub-cavity 1121 close to the first cavity 111 and a second sub-cavity 1122 away from the first cavity 111. In some embodiments, a portion (e.g., the button 16, the second microphone 172) of the auxiliary device may be arranged in the second sub-cavity 1122. For example, as shown in FIG. 18 and FIG. 19, the button 16 and/or the second microphone 172 may be fixed between the base plate 1151 and the baffle plate 18 of the movement module 10. The baffle plate 18 may be used to withstand pressure from the user applied to the button 16. In some embodiments, the first microphone 171 may be arranged in the first sub-cavity 1121. For example, as shown in FIG. 19, the first microphone 171 may be fixed in a groove in the side plate 1152 of the movement module 10, which may prevent the transducer 12 from colliding with the first microphone 171 during vibration, thereby increasing the stability of the movement module 10. In some embodiments, when the auxiliary device is not included, the movement module 10 may not include a baffle plate. For example, when the acoustic device includes a first movement module and a second movement module respectively located on the left and right sides of the user's head, one of the first movement module and the second movement module may include the auxiliary device and the baffle plate 18, and the other may not include the auxiliary device and baffle plate 18.

In some embodiments, the baffle plate 18 may be used to adjust a size of the first sub-cavity 1121. For example, when the acoustic device includes the first movement module and the second movement module respectively located on the left and right sides of the user's head, and the sound outlet holes 113 of the first movement module and the second movement module respectively communicate with the first sub-cavities 1121 of the first movement module and the second movement module, volumes of the first sub-cavities 1121 of the first movement module and the second movement module are the same by adjusting the size of the first sub-cavity 1121, so that the frequency response curves of the air-conduction sounds output by the first movement module and second movement module tend to be the same, which improves the acoustic performance of the acoustic device. Because the size of the first sub-cavity 1121 is adjusted by the baffle plate 18, the volume of the auxiliary device in the first movement module or the second movement module does not affect the size of the first sub-cavity 1121, so that the volumes of the auxiliary devices arranged in the first movement module and the second movement module may be different. For example, when the first movement module and the second movement module are respectively provided with the button 16 (as shown in FIG. 18) and the second microphone 172 (as shown in FIG. 19), volumes of the button 16 and the second microphone 172 may be different. In some embodiments, when one of the first movement module and the second movement module includes an auxiliary device and the other of the first movement module and the second movement module does not include an auxiliary device, the movement module that does not include an auxiliary device may include a baffle plate to adjust the size of the first sub-cavity 1121, so that the first sub-cavities 1121 of the first movement module and the second movement module have the same volume. In other embodiments, when one of the first movement module and the second movement module includes an auxiliary device and the other of the first movement module and the second movement module does not include an auxiliary device, the movement module that does not include the auxiliary device may not include the baffle plate, in which case the size of the second cavity 112 of the movement module that does not include the auxiliary device may be adjusted through other manners (e.g., arranging a filler), such that the size of the second cavity 112 of the movement module that does not include the auxiliary device is the same as a volume of the first sub-cavity 1121 of the movement module that includes the auxiliary device. It should be noted that, subjected to force majeure factors such as machining accuracy and assembly accuracy, the above-mentioned same volume (e.g., the volumes of the first sub-cavity 1121 of the first movement module and the second movement module, the volume of the second cavity 112 of the movement module that does not include the auxiliary device and the volume of the first sub-cavity 1121 of the movement module that includes the auxiliary device) may allow a certain difference, such as less than or equal to 10%.

In some embodiments, the second sub-cavity 1122 may be filled with an adhesive. A filling rate of the adhesive in the second sub-cavity 1122 may be greater than or equal to 90%, such that the second sub-cavity 1122 is as solid as possible, which may reduce or avoid the acoustic resonance between a hollow second sub-cavity 1122 and the first sub-cavity 1121, thereby improving the acoustic performance of the acoustic device. Merely by way of example, the adhesive may be a light-curing adhesive. The light-curable adhesive may be cured under an action of light. In some embodiments, other components in the movement module may be fixed through an adhesive (e.g., a light-curing adhesive). For example, the baffle plate 18 may be pre-fixed to the second housing 115 using a hot melt post, and then the pre-fixed baffle plate 18 is filled with the light-curing adhesive between the baffle plate 18 and the second housing 115. As another example, after accommodating the second microphone 172, the groove in the side plate 1152 may be filled with the light-curing adhesive for fixation. In some embodiments, the baffle plate 18 may be made of a light-transmissive material.

In some embodiments, according to FIG. 18 (or FIG. 19), FIG. 3, and FIG. 5, an outer end surface of the magnetic conduction cover 1221 of the transducer 12 away from the first cavity 111 is spaced apart from the baffle plate 18, which may prevent the magnetic conduction cover 1221 and the baffle plate 18 from colliding during the vibration of the transducer 12. In addition, a distance between a center region of the outer surface of the magnetic conduction cover 1221 and the baffle plate 18 may be greater than a distance between an edge region of the outer surface of the magnetic conduction cover 1221 and the baffle plate 18, i.e., a middle region of the first sub-cavity 1121 has more space than an edge region of the first sub-cavity 1121, which facilitates the air flow in the first sub-cavity 1121. Merely by way of example, a central region of the base plate 1223 of the magnetic conduction cover 1221 facing the side of the baffle plate 18 may be concaved into an arc surface in a direction away from the baffle plate 18 and/or a central region of a side of the baffle plate 18 facing the magnetic conduction cover 1221 may be concaved into an arc surface in a direction away from the magnetic conduction cover 1221.

It should be noted that the above descriptions of the components such as the auxiliary device, the processing circuit, and the baffle plate, and their arrangement manners are merely provided for the purposes of illustration, and do not limit the scope of the present disclosure. For those skilled in the art, various amendments and variations may be made to these components and their arrangement manners under the teachings of the present disclosure. For example, the movement module 10 (e.g., the first movement module, the second movement module) may be provided with no auxiliary device. These amendments and variations remain within the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a count of patentable classes or context including any new and useful process, machine, manufacture, or collocation of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the count of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Therefore, by way of example, but not of limitation, alternative configurations of the embodiments of the application may be utilized in accordance with the teachings herein. Accordingly, embodiments of the present application are not limited to that precisely as shown and described.

What is claimed is:

1. An acoustic device, comprising:

a housing configured to form a cavity;

a transducer arranged in the cavity and connected to the housing, wherein the housing produces a bone-conduction sound under an action of the transducer; and a diaphragm connected between the transducer and the housing to divide the cavity into a first cavity and a second cavity, wherein the housing is provided with:

at least one pressure relief hole communicating with the first cavity, at least one sound modulation hole communicating with the second cavity, at least a portion of the at least one pressure relief hole being arranged adjacent to at least a portion of the at least one sound modulation hole, and a sound outlet hole communicating with the second cavity, the diaphragm producing an air-conduction sound transmitted outward through the sound outlet hole during a relative movement of the transducer and the housing, wherein a containing region is arranged on an outer surface of the housing, a bulge is formed inside the containing region, outlet ends of the sound modulation hole and the pressure relief hole that are arranged adjacently are located on top of the bulge, and the bulge and a side wall of the containing region are spaced to form a containing groove surrounding the bulge.

2. The acoustic device of claim 1, wherein the at least one pressure relief hole includes a first pressure relief hole and a second pressure relief hole, the first pressure relief hole is arranged away from the sound outlet hole relative to the second pressure relief hole, and an area of an outlet end of the first pressure relief hole is larger than an area of an outlet end of the second pressure relief hole.

3. The acoustic device of claim 2, wherein the at least one sound modulation hole includes a first sound modulation hole and a second sound modulation hole, the first sound modulation hole is arranged away from the sound outlet hole relative to the second sound modulation hole, an area of an outlet end of the first sound modulation hole is larger than an area of an outlet end of the second sound modulation hole, the first pressure relief hole is arranged adjacent to the first sound modulation hole, and the second pressure relief hole is arranged adjacent to the second sound modulation hole.

4. The acoustic device of claim 2, wherein the at least one pressure relief hole further includes a third pressure relief hole, the first pressure relief hole is arranged away from the sound outlet hole relative to the third pressure relief hole, and the area of the outlet end of the second pressure relief hole is larger than an area of an outlet end of the third pressure relief hole.

5. The acoustic device of claim 2, wherein the sound outlet hole and the first pressure relief hole are arranged on two opposite sides of the transducer.

6. The acoustic device of claim 1, wherein a distance between the pressure relief hole and the sound modulation hole that are arranged adjacently is less than or equal to 2 mm.

7. The acoustic device of claim 1, wherein for the pressure relief hole and the sound modulation hole that are arranged adjacently, an area of an outlet end of the pressure relief hole is larger than an area of an outlet end of the sound modulation hole.

8. The acoustic device of claim 1, wherein the outlet ends of the pressure relief hole and the sound modulation hole that are arranged adjacently are covered with a first acoustic resistance mesh and a second acoustic resistance mesh, respectively, a porosity of the first acoustic resistance mesh is greater than a porosity of the second acoustic resistance mesh.

9. The acoustic device of claim 8, wherein the acoustic device further includes a protective cover, the protective cover covers periphery of the pressure relief hole and the sound modulation hole that are arranged adjacently, and the first acoustic resistance mesh and the second acoustic resistance mesh are arranged on a side, close to the housing, of the protective cover.

10. The acoustic device of claim 9, wherein the protective cover includes a main cover plate covering the pressure relief hole and the sound modulation hole that are arranged adjacently, the first acoustic resistance mesh and the second acoustic resistance mesh being fixed to a side, facing the pressure relief hole and the sound modulation hole, of the main cover plate.

11. The acoustic device of claim 10, wherein the protective cover includes an annular side plate, the annular side plate is bent and connected to an edge of the main cover plate, and the annular side plate is inserted into the containing groove and fixedly connected to the housing through an adhesive in the containing groove.

12. The acoustic device of claim 11, wherein the acoustic device further includes a first annular film, the first annular film surrounds the pressure relief hole and the sound modulation hole that are arranged adjacently, and the first acoustic resistance mesh and the second acoustic resistance mesh are fixed to the top of the bulge through the first annular film.

13. The acoustic device of claim 11, wherein the acoustic device further includes a second annular film, the second annular film surrounds the pressure relief hole and the sound modulation hole that are arranged adjacently, and the first acoustic resistance mesh and the second acoustic resistance mesh are fixed to the main cover plate through the second annular film.

14. The acoustic device of claim 1, wherein the acoustic device includes a baffle plate and an auxiliary device, wherein the baffle plate is arranged in the second cavity and divides the second cavity into a first sub-cavity close to the first cavity and a second sub-cavity away from the first cavity, the sound outlet hole is communicated with the first sub-cavity, the auxiliary device includes at least one of a button or a microphone, and a portion of the auxiliary device is arranged in the second sub-cavity.

15. The acoustic device of claim 1, wherein a frequency response curve of the bone-conduction sound has at least one resonant peak satisfying an equation:

$$|f1-f2|/f1 \leq 50\%$$

where f1 refers to a resonant frequency of a resonant peak of the bone-conduction sound when the diaphragm is connected to the transducer and the housing, and f2 refers to a resonant frequency of a resonant peak of the bone-conduction sound when the diaphragm is disconnected from either of the transducer and the housing.

16. The acoustic device of claim 1, wherein the outlet ends of the pressure relief hole and the sound modulation hole that are arranged adjacently are covered with a first acoustic resistance mesh and a second acoustic resistance mesh, respectively, the acoustic device further includes a protective cover, the protective cover covering periphery of the pressure relief hole and the sound modulation hole that are arranged adjacently, the first acoustic resistance mesh and the second acoustic resistance mesh being arranged on a side, close to the housing, of the protective cover, and the protective cover includes a main cover plate covering the pressure relief hole and the sound modulation hole that are arranged adjacently, the first acoustic resistance mesh and the second acoustic resistance mesh being fixed to a side, facing the pressure relief hole and the sound modulation hole, of the main cover plate.

17. The acoustic device of claim 16, wherein the acoustic device further includes a second annular film, the second annular film surrounds the pressure relief hole and the sound modulation hole that are arranged adjacently, and the first acoustic resistance mesh and the second acoustic resistance mesh are fixed to the main cover plate through the second annular film.

18. The acoustic device of claim 1, wherein the acoustic device further includes a protective cover, the protective cover covering periphery of the pressure relief hole and the sound modulation hole that are arranged adjacently, and the protective cover includes:

a main cover plate covering the pressure relief hole and the sound modulation hole that are arranged adjacently, and an annular side plate, the annular side plate being bent and connected to an edge of the main cover plate, the annular side plate being inserted into the containing groove and fixedly connected to the housing through an adhesive in the containing groove.

19. The acoustic device of claim 1, wherein the outlet ends of the pressure relief hole and the sound modulation hole that are arranged adjacently are covered with a first acoustic resistance mesh and a second acoustic resistance mesh, respectively, the acoustic device further includes a first annular film, the first annular film surrounding the pressure relief hole and the sound modulation hole that are arranged adjacently, and the first acoustic resistance mesh and the second acoustic resistance mesh are fixed to the top of the bulge through the first annular film.

20. The acoustic device of claim 1, wherein the at least a portion of the at least one pressure relief hole is arranged adjacent to the at least a portion of the at least one sound modulation hole, so that sound leakage output outside of the acoustic device through the pressure relief hole and the sound modulation hole that are arranged adjacently interferes and cancels each other.

* * * * *